United States Patent
Yazawa et al.

(10) Patent No.: US 7,258,487 B2
(45) Date of Patent: Aug. 21, 2007

(54) BEARING UNIT, AND MOTOR AND ELECTRONIC APPARATUS HAVING THE BEARING UNIT

(75) Inventors: Kenichiro Yazawa, Tokyo (JP); Takeshi Kaneko, Chiba (JP); Yoshiaki Kakinuma, Tokyo (JP); Yuji Shishido, Kanagawa (JP)

(73) Assignee: Sony Corporation (JP)

( * ) Notice: Subject to any disclaimer, the term of this patent is extended or adjusted under 35 U.S.C. 154(b) by 71 days.

(21) Appl. No.: 11/041,307

(22) Filed: Jan. 25, 2005

(65) Prior Publication Data

US 2005/0220379 A1 Oct. 6, 2005

(30) Foreign Application Priority Data

Feb. 6, 2004 (JP) ............................ P2004-030987

(51) Int. Cl.
*F16C 32/06* (2006.01)

(52) U.S. Cl. ..................... 384/100; 310/90; 384/903

(58) Field of Classification Search ............... 384/100, 384/107, 113, 114, 115, 119, 903; 310/90; 360/99.08, 98.07
See application file for complete search history.

(56) References Cited

U.S. PATENT DOCUMENTS

| | | | | |
|---|---|---|---|---|
| 2,457,472 A * | 12/1948 | Hufferd et al. | ............ | 411/902 |
| 3,121,583 A * | 2/1964 | Damm | ............ | 403/326 |
| 3,663,849 A * | 5/1972 | Heob | ............ | 310/90 |
| 4,093,323 A * | 6/1978 | Quandt et al. | ............ | 384/115 |
| 5,270,737 A * | 12/1993 | Nakasugi et al. | ............ | 384/107 |
| 6,310,415 B1 * | 10/2001 | Horng | ............ | 384/100 |
| 6,318,976 B1 * | 11/2001 | Hsieh | ............ | 310/90 |
| 6,498,412 B2 * | 12/2002 | Horng | ............ | 310/91 |
| 6,836,041 B2 * | 12/2004 | Chou et al. | ............ | 384/114 |
| 6,902,323 B2 * | 6/2005 | Chen | ............ | 384/226 |

FOREIGN PATENT DOCUMENTS

| | | |
|---|---|---|
| JP | 53-35007 | 3/1978 |
| JP | 2000-175401 | 6/2000 |

OTHER PUBLICATIONS

Japanese Office Action; Application No. 2004-030987; Dated: Apr. 3, 2007.

* cited by examiner

*Primary Examiner*—Thomas R. Hannon
(74) *Attorney, Agent, or Firm*—Rader Fishman & Grauer PLLC; Ronald P. Kananen

(57) ABSTRACT

The bearing unit of the present invention has: a shaft; a radial bearing which supports the shaft in a circumferential direction of the shaft; a thrust bearing which supports an end of the shaft in a thrust direction of the shaft; a housing having a closed structure except for a shaft insertion hole in which the shaft is inserted, with the radial bearing and the thrust bearing being provided inside the housing; a stopper member which prevents the shaft from being pulled out of the radial bearing; and viscous liquid filled in the housing. The stopper member is made of an elastic member which is elastically deformed only in the radial direction and is hardly deformed in the axial direction. Hence, the shaft is prevented from being pulled out from the housing, and shortage of the lubrication oil around bearing surfaces is prevented from being caused by lifting of the shaft.

6 Claims, 13 Drawing Sheets

BEARING UNIT, AND MOTOR AND ELECTRONIC APPARATUS HAVING THE BEARING UNIT

BACKGROUND OF THE INVENTION

1. Field of the Invention

The present invention relates to a bearing unit which rotatably supports a rotation shaft or rotatably supports a rotation member on the shaft and a motor and an electronic apparatus each having the bearing unit.

This application claims priority of Japanese Patent Application No. 2004-030987, filed on Feb. 6, 2004, the entirety of which is incorporated by reference herein.

2. Description of the Related Art

Conventionally, a structure shown in FIG. 1 is known as a bearing unit which rotatably supports a rotation shaft.

The bearing unit 100 shown in FIG. 1 rotatably supports a rotation shaft 101, and has a radial bearing 104 which supports the rotation shaft 101 in the circumferential rotation about the rotation shaft 101, a spacing member 120 on which a thrust bearing 110 supporting an end of the rotation shaft 101 in the thrust direction is formed, and a housing 105 which contains the radial bearing 104 and the spacing member 120.

In this bearing unit 100, the radial bearing 104 constructs a dynamic fluid bearing together with a lubricant oil which is a viscous fluid filled in the housing 105. A dynamic pressure generation groove 111 is formed in the inner circumferential surface in which the rotation shaft 101 is inserted to generate a dynamic pressure.

A spacing member 120 provided at one end side of the rotation shaft 101 in the thrust direction is formed to surround a lower part of the rotation shaft 101, i.e., an end thereof at the closed side, as shown in FIG. 1. For example, the spacing member 120 is made of synthetic resins. Inside the spacing member 120, a hydraulic oil is filled around a bearing support part 102 of the rotation shaft 101.

A thrust bearing 110 supporting rotatably the bearing support part 102 provided at one end side of the rotation shaft 101 that is supported by the radial bearing 104 in the thrust direction is formed integrally at a center part in the inner surface side of the bottom of the spacing member 120. The thrust bearing 110 shares the spacing member 120 which is integrally made of resins. The thrust bearing 110 is formed as a pivot bearing which supports, at one point, the bearing support part 102 of the rotation shaft 101 formed in like an arc or tapered shape.

As shown in FIG. 1, the housing 105 which contains the radial bearing 104 and the spacing member 120 has such a shape that contains and surrounds the radial bearing 104 formed in a cylindrical shape. The housing 105 is thus a member formed by integrally molding synthetic resins.

The housing 105 is constituted by a cylindrical housing body 106, a bottom shielding part 107 which constructs an end part formed integrally with the housing body 106 so as to close an end side of the housing body 106, and an upper shielding part 108 formed integrally with the housing body 106 which constructs the other end side of the housing body 106. A bearing insertion hole 109 in which the rotation shaft 101 supported rotatably by the radial bearing 104 contained in the housing 106 is inserted is provided at a center part of the upper shielding part 108.

In the housing 105 thus constructed, synthetic resin material is subjected to outsert molding so as to surround the cylindrical radial bearing 104 and spacing member 120. Thus, the radial bearing 104 is integrally formed and provided in the inner peripheral side of the housing body 106.

The rotation shaft 101 is supported, on one end side thereof, by the bearing support part 102 and the thrust bearing 110. The outer circumferential surface of a shaft body 103 is supported by the radial bearing 104. The side of the attachment part of the rotation shaft 101, which is provided on the other end side, is protruded from the shaft insertion hole 109 provided in the upper shielding part 108 of the housing body 106. The rotation shaft 101 is thus supported on the housing 105.

The rotation shaft 101 also is provided with a groove part 116 for stopping the shaft provided between the bearing support part 102 and the shaft body 103. The spacing member 120 is provided with a circular washer 115 as a shaft stopper member, so as to correspond to the groove part 116 as a shaft stopper. The washer 115 prevents the rotation shaft 101 from being pulled out of the housing 105.

As shown in FIGS. 2 to 4, the washer 115 is attached to the groove part 116 of the rotation shaft 101. That is, as shown in FIG. 2, the rotation shaft 101 is inserted in the housing 105 having the radial bearing 104, the spacing member 120, and washer 115. Next, as shown in FIG. 3, the washer 115 provided in the spacing member is pressed against the bearing support part 102 of the rotation shaft 101 and is deformed in the thrust direction. The bearing support part 112 is thus inserted. Further, as shown in FIG. 4, the rotation shaft 101 is installed in the housing, at such a position in which the bearing support part 112 penetrates the washer 115 and the shaft stopper groove part 116 is situated inside the washer 115. At this time, the washer 115 is not deformed any more but has a normal shape and is set on the shaft stopper groove part 116 of the rotation shaft 101. The washer 115 attached to the rotation shaft 101 prevents the rotation shaft 101 from being pulled out of the housing 105.

Meanwhile, the shaft insertion hole 109 is formed to have an inner diameter slightly greater than the outer shape of the shaft body 103, such that the rotation axis 101 inserted in the shaft insertion hole 109 might not slide on the inner circumferential surface of the shaft insertion hole 109. At this time, the shaft insertion hole 109 is formed so as to have a gap 112 of a distance x5, enough to prevent a hydraulic oil 113 filled between the circumferential surface and the outer circumferential surface of the shaft body from leaking out of the housing 105.

A tapered part 114 is provided on the outer circumferential surface opposed to the inner circumferential surface of the shaft insertion hole 109 of the rotation shaft 101. This tapered part 114 is inclined to enhance the gap 112 formed between the outer circumferential surface of the rotation shaft 101 and the inner circumferential surface of the shaft insertion hole 109, toward the outside of the housing 105. This tapered part 114 creates a pressure gradient with respect to the gap 112 formed between the outer circumferential surface of the rotation shaft 101 and the inner circumferential surface of the shaft insertion hole 109, and generates a force which draws the hydraulic oil 113 filled in the housing 105 toward the inside of the housing 105. When the rotation shaft 101 is rotated, the hydraulic oil 113 is drawn into the inside of the housing 105, so that the hydraulic oil 113 steadily enters into the dynamic pressure generation groove 111 of the radial bearing 104 composed of a dynamic pressure fluid bearing, thereby generating a dynamic pressure. The rotation shaft 101 is thus supported stably, and the hydraulic oil 113 filled in the housing 105 can be prevented from leaking.

In the bearing unit 100 constructed as shown in FIG. 1, the rotation shaft 101 is exposed only at one end in the side of the shaft insertion hole 109. The other parts of the rotation shaft 101 than the shaft insertion hole 109 are covered seamlessly by a housing member. Therefore, the bearing unit 100 can prevent the hydraulic oil 113 from leaking to the outside of the housing 105. In addition, since the part communicating with the outside is only the gap of the shaft insertion hole 109, the hydraulic oil can be prevented from scattering due to impact. Further, due to the washer 115, the bearing unit 100 can prevent the rotation shaft 101 from being pulled out of the housing 105.

However, in the bearing unit 100 described above, the washer 115 needs to be warped when the rotation shaft 101 is inserted in the housing and the washer 115 is attached to the rotation shaft 101. A gap x3 between the radial bearing 104 and the washer 115 as well as a gap x4 between the washer 115 and the rotation shaft 101 needs to be provided.

Therefore, the bearing unit 100 has a structure in which the rotation shaft 101 is movable vertically over a range equivalent to the gap x3 and the gap x4. In the bearing unit 100, when the rotation shaft is lifted up from the housing, by a distance equivalent to the gaps x3 and x4, the liquid surface of the hydraulic oil 113 lowers down by the distance by which the rotation shaft moves from the liquid surface of the hydraulic oil. At this time, air enters into the bearing unit from the shaft insertion hole 109, driving away the hydraulic oil 113 in the gap between the radial bearing 104 and the shaft body 103 of the rotation shaft 101. This may involve a hindrance to the rotation performance of the bearing unit. Alternatively, air which has once entered may swell due to influences from the temperature and the air pressure, and the hydraulic oil may leak to the outside of the unit.

To prevent this problem, the dimension x6 of the upper end surface of the housing 105 may be elongated from the upper end surface of the radial bearing 104 to ensure a sufficient amount of hydraulic oil. Then, the height dimension of the bearing unit has to be enlarged. Another measure is conceivable in which the gap x5 between the shaft insertion hole 109 and the outer shape of the rotation shaft 101 may be widened to ensure the amount of hydraulic oil. However, the widening of the gap x5 may result in leakage of hydraulic oil when the unit is used, placed laterally, or has a vibrating impact.

SUMMARY OF THE INVENTION

An object of the present invention is to provide a bearing unit, and a motor and an electronic apparatus each having the bearing unit, wherein a shaft of the bearing unit is prevented from being pulled out from a housing, and the liquid surface of a lubrication oil filled in the housing is prevented from lowering with air mixed into the lubrication oil between a radial bearing and the shaft even when the shaft is pulled out from the housing, so that excellent lubrication can be attained.

To achieve the above object, a bearing unit according to the present invention comprises: a shaft; a radial bearing which supports the shaft in a circumferential direction of the shaft; a thrust bearing which supports an end of the shaft in a thrust direction of the shaft; a housing having a closed structure except for a shaft insertion hole in which the shaft is inserted, with the radial bearing and the thrust bearing being provided inside the housing; a stopper member provided on an end side of the radial bearing where the thrust bearing is provided, to prevent the shaft from being pulled out of the radial bearing; and viscous liquid filled in the housing, wherein the stopper member is made of an elastic member which is elastically deformed only in the radial direction of the shaft when the shaft is inserted in the housing and is hardly deformed in the axial direction.

As described above, in the bearing unit according to the present invention, the stopper member is elastically deformed in the radial direction of the shaft by an end part on the insertion side of the shaft, when the shaft is inserted. Therefore, the stopper member does not obstruct insertion of the shaft. Once the shaft is inserted, the stopper member functions as a stopper which prevents the shaft from falling off or being pulled out of the housing because the stopper member is hardly deformed in the axial direction. As a result of this, movement of the shaft in the axial direction is regulated by the stopper member, so that the shaft is prevented from being pulled out from the housing.

Further, the stopper member does not have such a structure in which the stopper member is warped in the axial direction to allow the shaft to be inserted when the shaft is inserted, as shown in the prior art. Therefore, it is unnecessary to provide an extra gap which allows the stopper member to be warped in the axial direction when the stopper member is attached. As a result, the shaft is prevented from moving a distance corresponding to the extra gap for allowing the stopper member to be warped, and is accordingly prevented from being pulled out.

Thus, according to the present bearing unit, the liquid surface of the lubrication oil in the housing is not lowered because of lifting up of the shaft. Further, air is not mixed up in the lubrication oil between the radial bearing and the shaft by such lowering of the liquid surface. In addition, the lubrication oil is not pushed out to cause leakage by such air.

To also achieve the above object, a motor according to the present invention is a motor having a bearing unit which supports rotatably a rotor relatively to a stator. The bearing unit used in this motor is as described above.

To also achieve the above object, an electronic apparatus according to the present invention has a motor having a bearing unit which supports rotatably a rotor relatively to a stator. The bearing unit used in this motor is as described above.

According to the present invention, there is provided a stopper member made of an elastic member which is elastically deformed only in the radial direction of the shaft when the shaft is inserted and which is hardly deformed in the axial direction. It is therefore possible to extremely reduce the size of the gap between the radial bearing and the stopper member, which allows the shaft to move in the axial direction, and the size of the gap between stopper member and the housing. Accordingly, the shaft is prevented from being pulled out from the housing, so that the liquid surface of the lubrication oil is prevented from lowering due to pulling out of the shaft. As a result, air is prevented from being mixed in the lubrication oil filled between the radial bearing and the shaft, so that the lubrication oil can be steadily maintained between the radial bearing and the shaft.

Also according to the present invention, the lubrication oil between the radial bearing and the shaft can be maintained steadily for a long time period. Excellent lubrication and excellent rotation performance can be maintained.

DETAILED DESCRIPTION OF THE PREFERRED EMBODIMENTS

In the following, an information processing apparatus (electronic apparatus) to which the present invention is applied will be explained with reference to the drawings.

Figure 1:
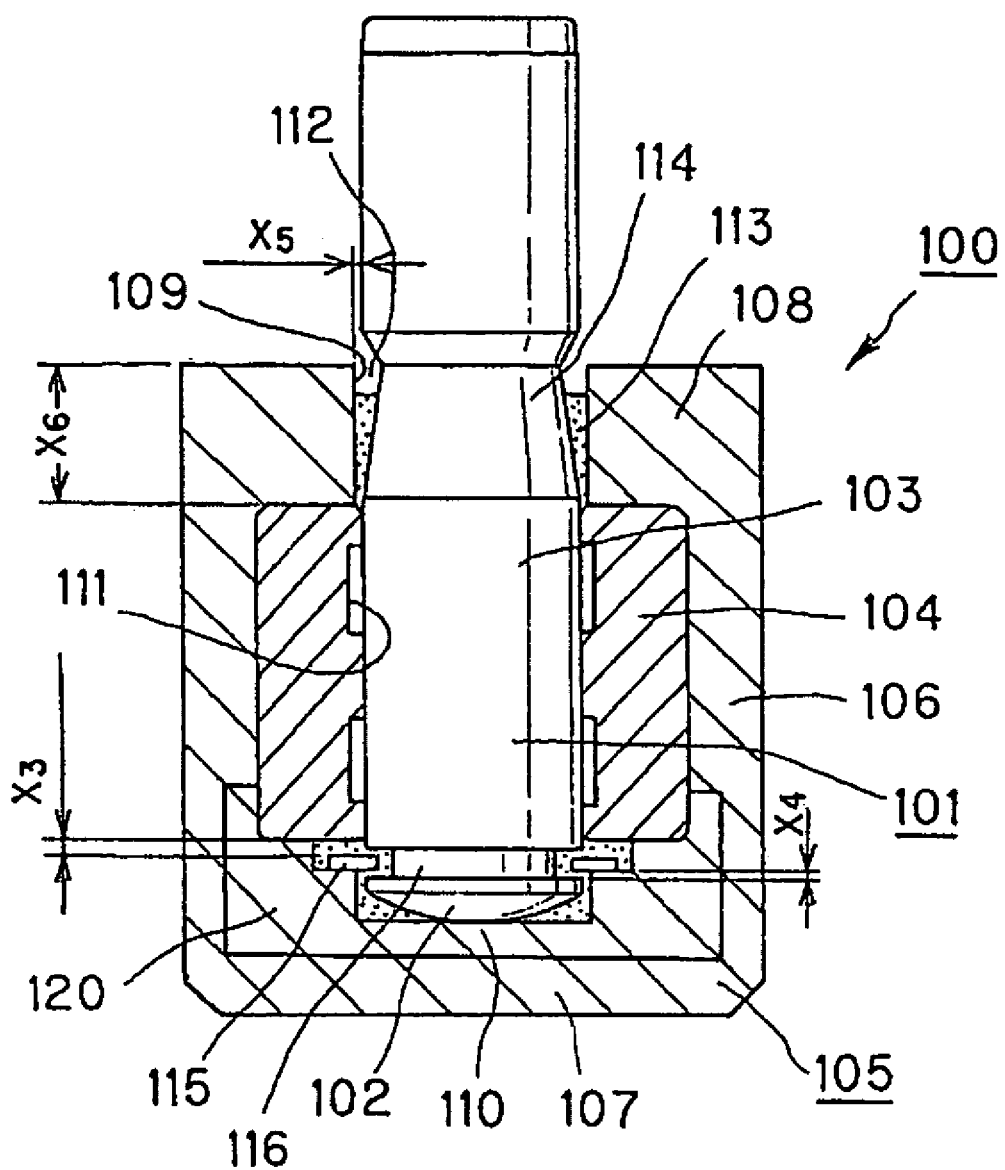
FIG. 1 is a cross-sectional view showing a bearing unit conventionally used.
Figure 2:
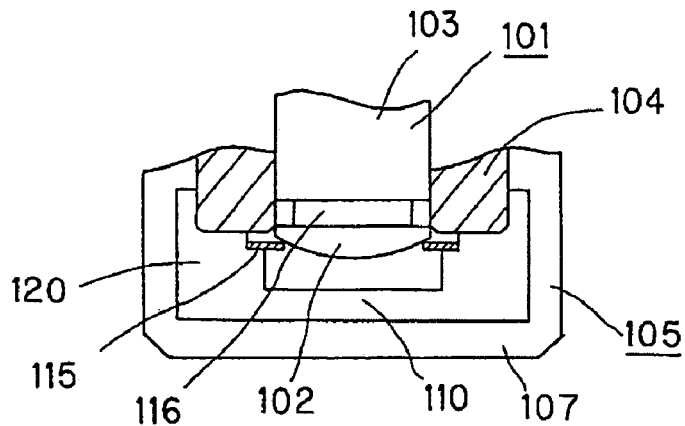
FIG. 2 is a view showing insertion of a shaft in a housing of the bearing unit conventionally used.
Figure 3:
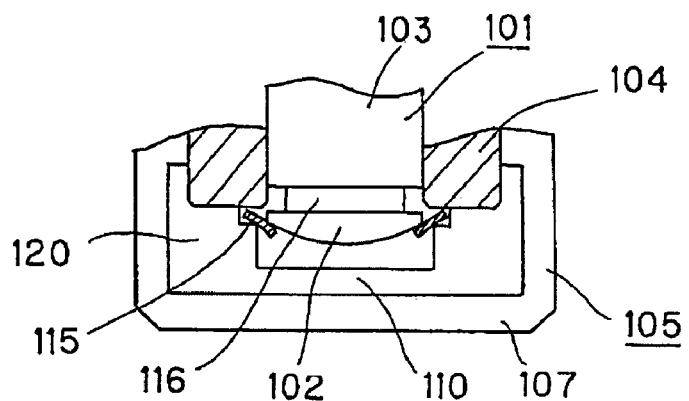
FIG. 3 is a view showing warping of a stopper member in the axial direction when a shaft is inserted in a housing of the bearing unit conventionally used.
Figure 4:
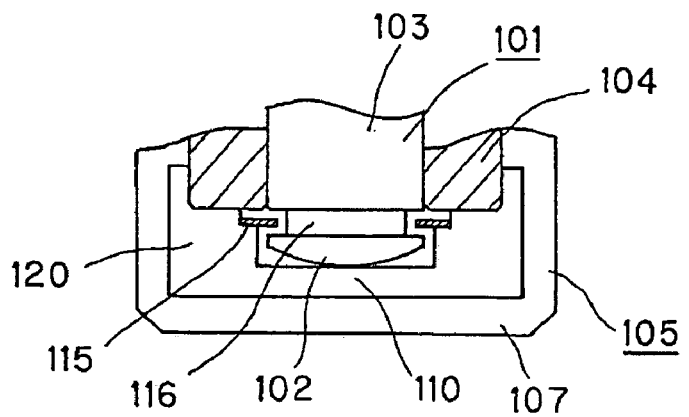
FIG. 4 is a view showing a state where a shaft is inserted in a housing of the bearing unit conventionally used.
Figure 5:
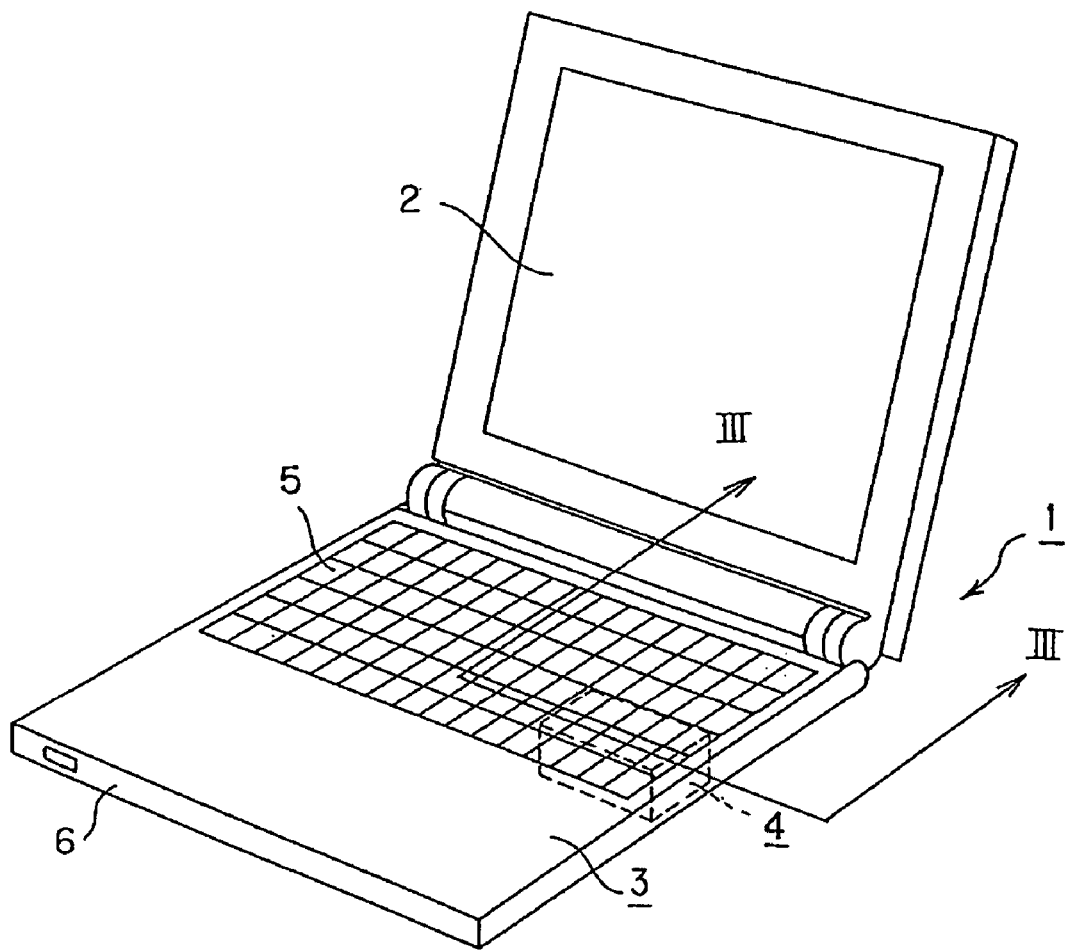
FIG. 5 is a perspective view showing an information processing apparatus to which the present invention is applied.

As shown in FIG. 5, the information processing apparatus to which the present invention is applied is a notebook-type personal computer, and it has a display unit 2 which displays results of information processing and a computer body 3 which includes an information processing unit which performs calculation processing on various information. A keyboard 5 for inputting operation commands of the computer 1 or various information is provided on the upper surface side of the computer body 3. A heat radiator 4 is provided therein. The heat radiator 4 radiates heat generated from information processing circuits such as a CPU, a disk device, and the like, which are provided inside the computer body 3, to the outside. The heat radiator 4 also functions as a cooler which cools down the inside of the computer body 3.

Figure 6:
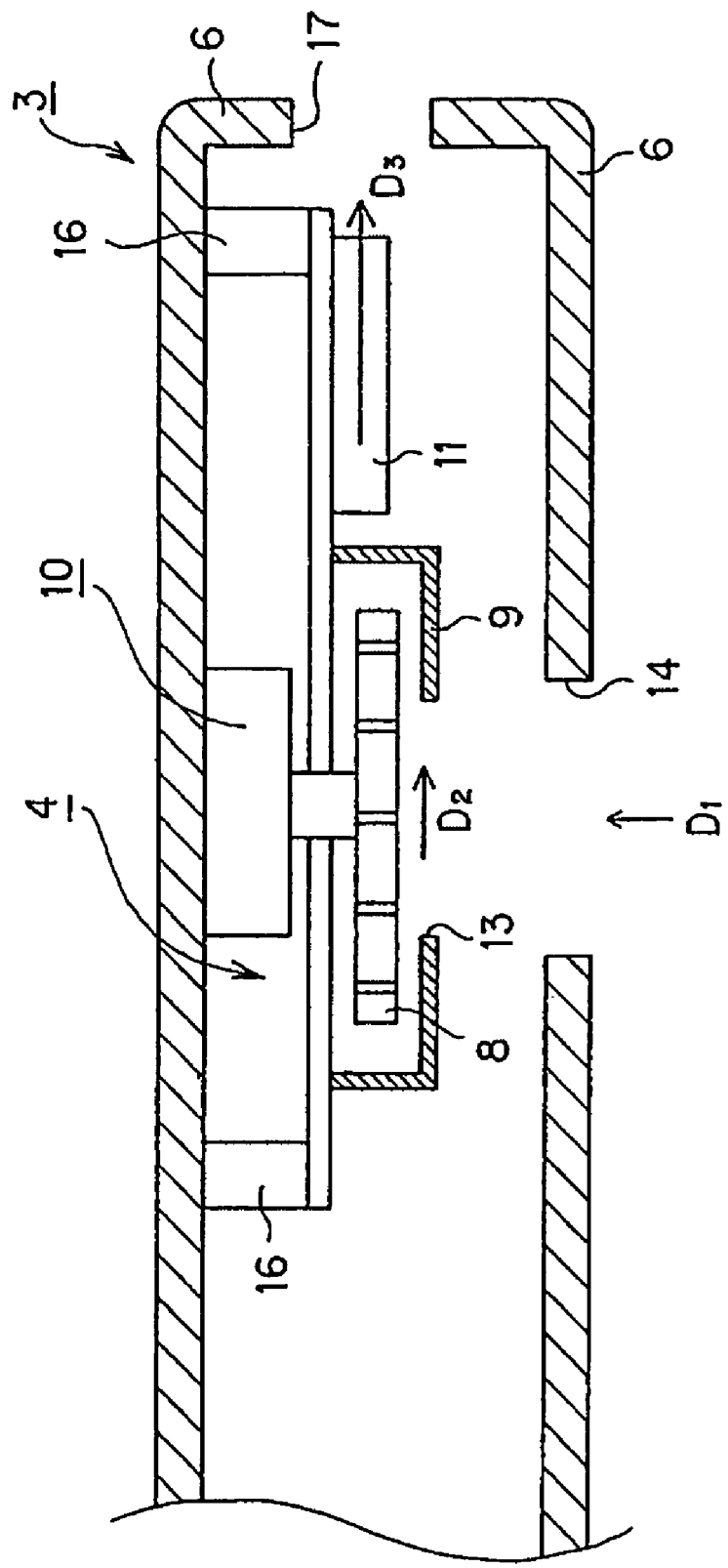
FIG. 6 is a cross-sectional view showing a cross-section along the line III-III shown in FIG. 5.

The heat radiator 4 included in the computer body 3 is contained in a casing 6 forming part of the computer body, as shown in FIG. 6. The heat radiator 4 has a metal-made base 7, a motor 10 attached to the base 7, a fan 8 rotated by the motor 10, a fan case 9 containing the fan 8, and a heat sink 11, as shown in FIG. 7.

Figure 7:
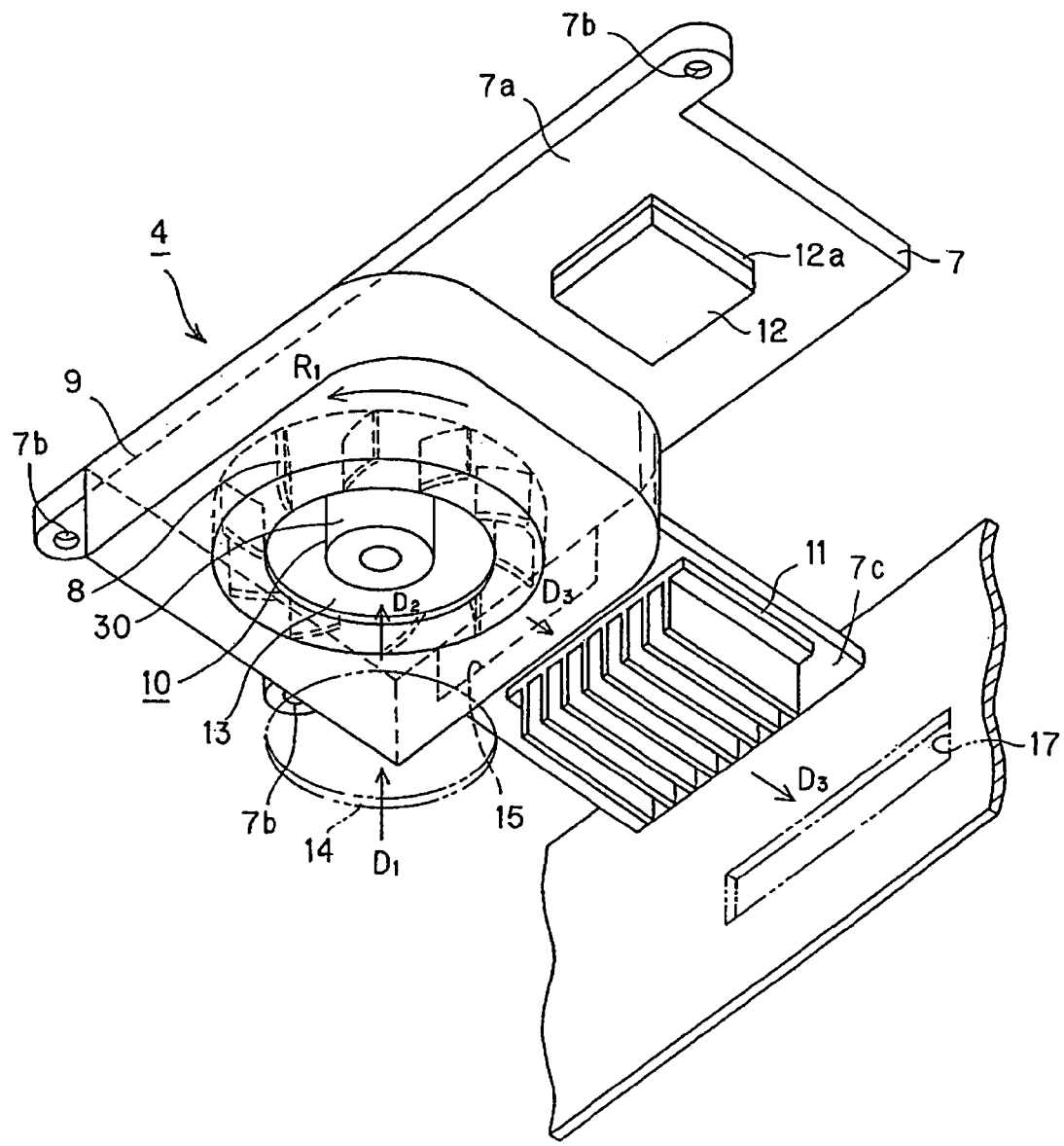
FIG. 7 is a perspective view showing a heat radiator using a motor to which the present invention is applied.

As shown in FIG. 7, the base 7 is substantially L-shaped. A heat generation element 12 which is rendered electrically conductive to generate heat like a CPU (Central Processing Unit) is attached to the surface 7a in one end side of the L-shaped base 7.

At an approximate center part of the one surface 7a of the base 7, the motor 10 as well as the fan case 9 storing the fan 8 that is rotated by the motor 10 are attached. The heat generation element 12 is attached to the one surface 7a of the base 7 through a heat transfer seal 12a. The fan case 9 is provided with a circular inlet port 13 which is open at the position corresponding to the center part of the fan 8 rotated by the motor 10. At the position opposite to the inlet port 13 provided in the fan case 9 in the bottom side of the casing 6, an opening 14 is formed so as to communicate with the suction port 13. Further, the fan case 9 is provided with an outlet port 15 for discharging air suctioned through the inlet port 13 to the outside.

The heat sink 11 is fixed to the surface 7c in the other end side of the base 7. The heat sink 11 is a corrugated or fin-like heat sink and is made from metal which has an excellent heat radiation characteristic, like aluminum. The base 7 and the fan case 9 should desirably be created from aluminum and iron, which are metals having an excellent heat radiation characteristic.

The base 7 to which the heat generation element 12, the heat radiator 4, and the heat sink 11 are attached has plural attachment holes 7b in which screws are inserted when assembling the base 7 onto the casing 6. The heat radiator 4 and the heat sink 11 radiate heat generated from the heat generation element 12. The base 7 is attached to the casing 6 in a manner that fixing screws to be inserted in attachment holes 7b are fixed to bosses 16 provided in the casing 6, as shown in FIG. 6.

The heat sink 11 is provided at the position opposite to a through-hole 17 formed in a side surface of the casing 6, where the base 7 is assembled in the casing 6, as shown in FIGS. 6 and 7.

The heat radiator 4 constructed as described above suctions air from outside the apparatus via the opening 14 formed in the casing 6, in the arrow direction D1 in FIGS. 6 and 7, as the motor 10 is driven and the fan 8 is rotated in the arrow direction R1 in FIG. 7. Further, the heat radiator 4 suctions air into the fan case 9 via the inlet port 13. The air suctioned into the fan case 9 by rotation of the fan 8 flows in the arrow direction D2 in FIGS. 6 and 7, and further flows through the heat sink 11 in the arrow direction D3 in FIG. 7. The air is then discharged to the outside of the casing 6 via the through-hole 17.

Meanwhile, heat generated by the driven heat generation element 12 attached to the base 7 is transmitted to the heat sink 11 attached to the base 7, through the base 7 made of metal having an excellent heat radiation characteristic. At this time, the fan 8 of the heat radiator 4 is rotated by the motor 10, suctioning air from the outside of the casing 6. The air flows through the plural fins of the heat sink 11, thereby absorbing the heat transmitted to the heat sink 11. The heat is thus radiated to the outside of the casing 6 via the through hole 17.

Figure 8:
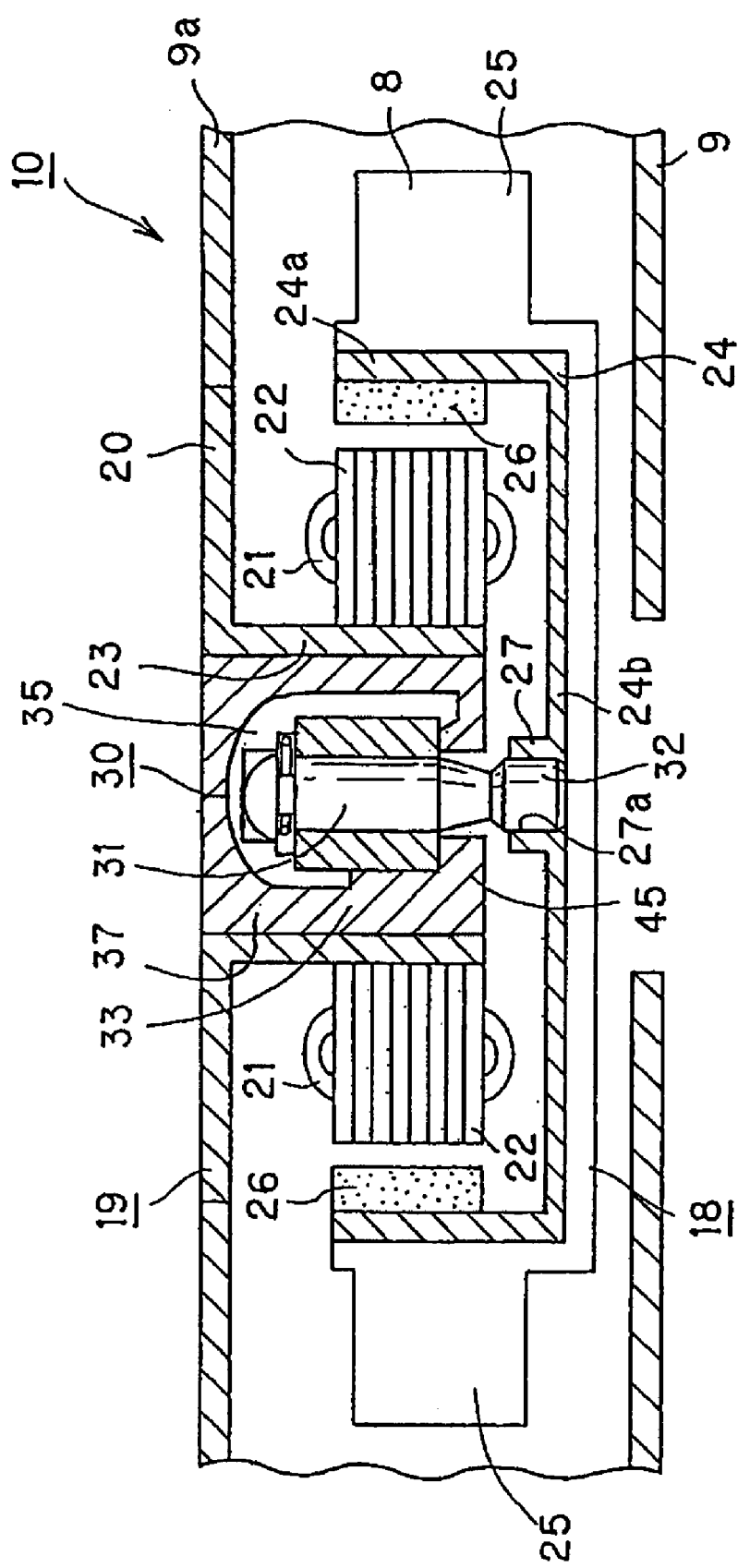
FIG. 8 is a cross-sectional view showing the structure of the motor to which the present invention is applied.

The motor 10 used in the heat radiator, to which the present invention is applied, has a rotor 18 and a stator 19, as shown in FIG. 8.

The stator 19 is formed integrally, together with the motor 10, on the upper surface plate 9*a* of the fan case 9 which contains the fan 8 rotated by the motor 10. The stator 19 has a stator yoke 20, a bearing unit 30 to which the present invention is applied, a coil 21, and a core 22 around which the coil 21 is wound. The stator yoke 20 may be formed integrally with the upper surface part 9*a* of the fan case 9, i.e., may be formed of a part of the fan case 9 or may be formed separately. The stator yoke 20 is formed of, for example, iron. The bearing unit 30 is pressed in and/or bonded to a holder 23 formed in a cylindrical shape in the center of the stator yoke 20.

Note that the holder 23 in which the bearing unit 30 is pressed is cylindrically formed integrally with the stator yoke 20.

The core 22 around which the coil 21 supplied with a drive current is attached to the outer circumference of the holder 23 formed integrally with the stator yoke 20, as shown in FIG. 8.

The rotor 18 which constructs the motor 10 together with the stator 19 is attached to the rotation shaft 31 rotatably supported by the bearing unit 30. The rotor 18 rotates integrally with the rotation shaft 31. The rotor 18 has a rotor yoke 24 and the fan 8 including plural wings 25 which rotate together with the rotor yoke 24. The wings 25 of the fan 8 are subjected to outsert molding on the circumferential surface of the rotor yoke 24, and thus formed integrally with the rotor yoke 24.

A ring-like rotor magnet 26 is provided on the inner circumferential surface of a cylindrical part 24*a* of the rotor yoke 24, such that the magnet 26 faces the coil 21 of the stator 19. This magnet 26 is a plastic magnet and is magnetized such that the S and N polarities appear alternatingly in the circumferential direction. The magent 26 is fixed to the inner circumferential surface of the rotor yoke 24 by an adhesive agent.

The rotor yoke 24 is attached to be rotatable integrally with the rotation shaft 31 in a manner that an attachment parts 32 provided on the top end side of the rotation shaft 31 supported by the bearing unit 30 is pressed in a boss part 27 in which a through hole 27*a* provided at the center part of the flat plate part 24*b* is provided.

In the motor 10 having the structure as described above, when the coil 21 in the side of the stator 19 is supplied with a drive current according to a predetermined electric conduction pattern from a drive circuit part provided outside the motor 10 the rotor 18 rotates integrally with the rotation shaft 31 due to influences from a magnetic field generated by the coil 21 and another magnetic field generated by the rotor magnet 26 in the rotor 18 side. As the rotor 18 thus rotates, the fan 8 having the plural wings 25 attached to the rotor 18 rotate integrally with the rotor 18. Since the fan 8 is thus rotated, air outside the apparatus is suctioned in the arrow direction D1 shown in FIGS. 6 and 7 through the opening 14 provided in the casing 6. The air further flows in the arrow direction D2 through the heat sink 11, and is then discharged to the outside of the casing 6 via the through-hole 17. Thus, heat generated from the heat generation element 12 is radiated to the outside of the computer body 3, so that the computer body 3 is cooled.

Figure 9:
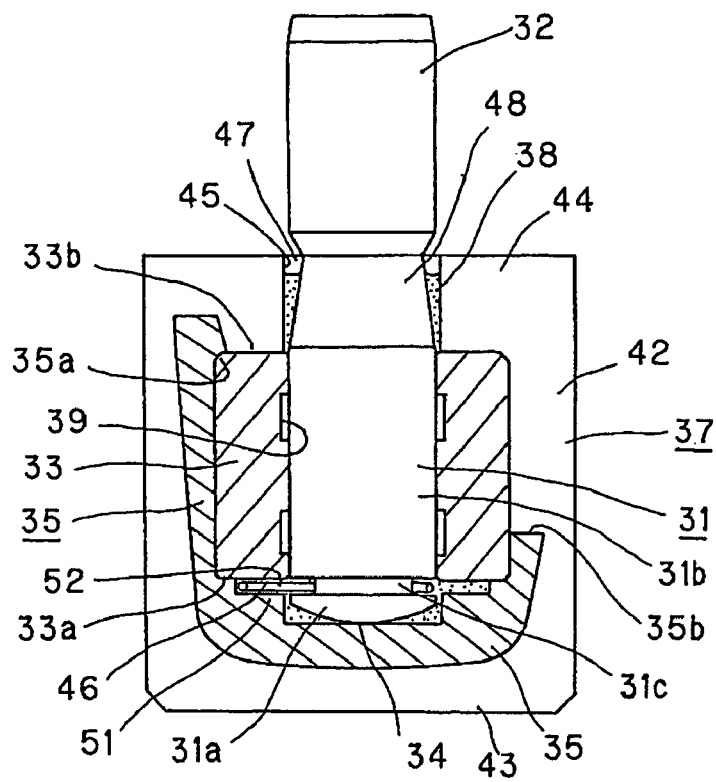
FIG. 9 is a cross-sectional view showing a bearing unit to which the present invention is applied.

The bearing unit 30 which rotatably supports the rotation shaft 31 of the motor 10 has, as shown in FIGS. 8 and 9, a radial bearing 33 which supports the rotation shaft 31 in the circumferential direction, a spacing member 35 which is formed integrally with the thrust bearing 34 which supports an end of the rotation shaft 31 in the thrust direction, and a housing 37 which contains the radial bearing 33 and the spacing member 35.

The radial bearing 33 is formed of sintered metal in a cylindrical shape. The radial bearing 33 together with a lubrication oil 38 as a viscous fluid filled in the housing 37 constructs a dynamic pressure fluid bearing. Dynamic pressure generation grooves 39 are formed in the inner circumferential surface through which the rotation shaft 31 is inserted.

The dynamic pressure generation grooves 39 are formed such that a pair of V-shaped grooves 39*a* are formed in the inner circumferential surface of the radial bearing 33 and connected by a link groove 39*b* continuously in the circumferential direction. The dynamic pressure generation grooves 39 are formed with their top end side of the pair of V-shaped grooves 39*a* oriented in the rotation direction R2 of the rotation shaft 31. In the present embodiment, a pair of dynamic pressure generation groove 39 are formed, arranged in parallel vertically in the axial direction of the cylindrical radial bearing 33. The number and size of dynamic pressure generation grooves provided in the radial bearing 33 are appropriately selected, depending on the size and length of the radial bearing 33. Note that the radial bearing 33 may be made of brass, stainless steel, or high-molecule material.

Figure 10:
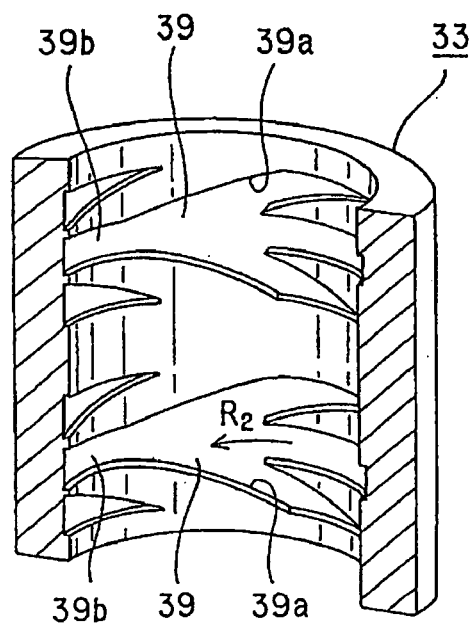
FIG. 10 is a perspective view showing dynamic pressure generation grooves formed in the inner circumferential surface of a radial bearing.

In the radial bearing 33 formed as a dynamic pressure fluid bearing, when the rotation shaft 31 inserted in the radial bearing 33 rotates continuously in the arrow direction R2 in FIG. 10 about the center axis CL, a hydraulic oil 38 filled in the housing 37 flows through the dynamic pressure generation grooves 39, generating a dynamic pressure between the outer circumferential surface of the rotation shaft 31 and the inner circumferential surface of the radial bearing 33, to support the rotating rotation shaft 31. The dynamic pressure generated at this time extremely reduces the friction coefficient between the rotation shaft 31 and the radial bearing 33, realizing smooth rotation of the rotation shaft 31.

Figure 11:
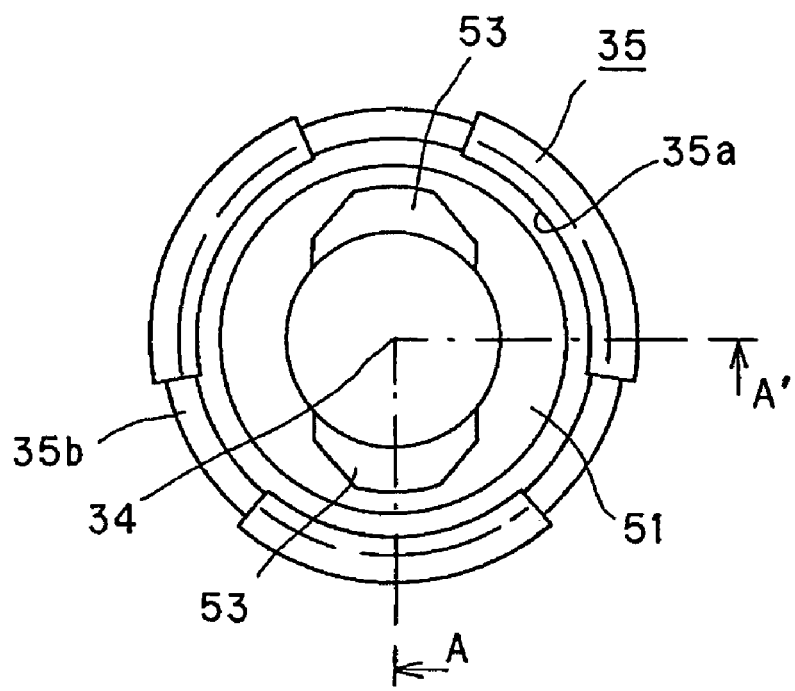
FIG. 11 is a plan view showing a spacing member of a bearing unit to which the present invention is applied.
Figure 12:
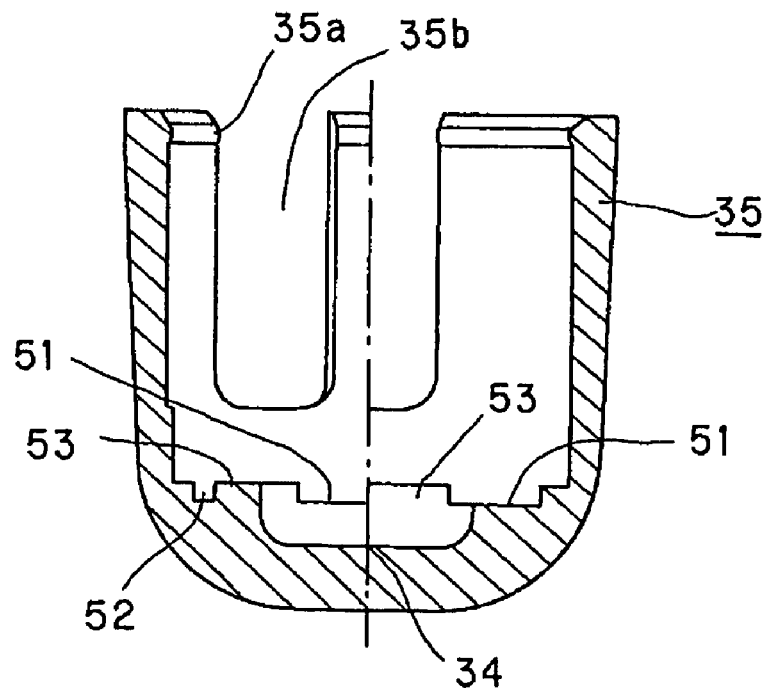
FIG. 12 is a cross-sectional view of the spacing member of the bearing unit to which the present invention is applied, cut along A-A' shown in FIG. 11.

The spacing member 35 provided on one end side in the thrust direction of the rotation shaft 31 is formed, as shown in FIGS. 9, 11, and 12, so as to surround a lower part of the rotation shaft 31 which is an end in the closed side. For example, the spacing member 35 is made of synthetic resins. Inside the spacing member 35, a hydraulic oil is filled around the bearing support part 31*a* of the rotation shaft 31.

The thrust bearing 34 which rotatably supports the bearing support part 31*a* provided on one end side in the thrust direction of the rotation shaft 31 supported by the radial bearing 33 is integrally formed at the center part of the inner bottom surface of the spacing member 35. The thrust bearing 34 shares the spacing member 35 made of resins. The thrust bearing 34 is formed as a pivot bearing which supports, on one point, the bearing support part 31a of the rotation shaft 31 formed in an arc-like or tapered shape.

As shown in FIGS. 11 and 12, a step part 51 is formed slightly outside the center part of the inner surface of the bottom of the spacing member 35, the step part 51 stepped from the center part of the inner surface of the bottom. A space 52 for providing a shaft stopper member 46 described later is formed between the step part 51 and an end side 33a where the thrust bearing 34 of the radial bearing 33 is provided, i.e., the lower end part. The step part 51 of the spacing member 35 regulates rotation of the shaft stopper member 46 in the circumferential direction about the shaft, and it is provided with regulation protrusions 53 which regulate the position of the stopper member 46 in the housing 37.

Provided circumferentially at an upper part of the spacing member 35 is a plurality of nail-like regulation parts 35a for fixing the upper surface part, i.e., the other end side 33b opposite to the one end side 33a of the radial bearing 33. The nail-like regulation parts 35a are suitable for temporary assembly with the radial bearing 33, a stopper member 46 described later, and the like contained inside the spacing member 35. In addition, cut-off parts 35b are provided in the side surface of the spacing member 35, in order to make the outer circumferential surface of the radial bearing 33 exposed to the outside when the radial bearing 33 is contained. These cut-off parts 35b are suitable for integrating the radial bearing 33, the spacing member 35, and the housing 37 in a process of integrally molding the housing body 42 after temporary assembly with the radial bearing 33 contained in the spacing member 35.

Although the spacing member 35 is made of resins in the foregoing description, this member may be made of metal or may be a combination of resins and metal. Thus, material of the spacing member 35 is not limited. For example, resin material used for the spacing member 35 may be fluorinated synthetic resins such as polyimide, polyamide, or polyacetal, synthetic resins such as polytetrafluoro-ethylene (Teflon (registered commercial name)), or nylon, or synthetic resins such as PC (polycarbonate) or ABS (acrylonitrile-butadiene-styrene).

The housing 37 containing the radial bearing 33 and the spacing member 35 has a shape containing and surrounding the radial bearing 33 and the spacing member 35, as shown in FIG. 9, and is one single member formed by integral molding of synthetic resins.

As shown in FIG. 9, the housing 37 is constituted by a cylindrical housing body 42, a bottom shielding part 43 forming part of an end side part formed integrally with the housing body 42 so as to close one end side of the housing body 42, and an upper shielding part 44 formed integrally with the housing body 42 and forming part of another end side of the hosuign body 42. At the center part of the upper shielding part 44, a shaft insertion hole 45 in which the rotation shaft 31 supported rotatably by the radial bearing 33 contained in the housing 37 is inserted is provided.

In case of the housing 37 constructed as described above, synthetic resin material is subjected to outsert molding, so as to surround the radial bearing 33 and the spacing member 35. In this manner, the housing 37 is integrally formed with the radial bearing 33 and the spacing member 35 provided in the inner circumferential side of the housing body 42.

The synthetic resin material forming the housing 37 is not particularly limited. However, it is desirable to use material which enlarges the contact angle to a lubrication oil 38, at which the lubrication oil 38 filled in the housing 37 is repelled. Further, synthetic resin material having an excellent lubrication characteristic should be used for the housing 37. The housing 37 is, for example, made of POM (polyoxymethylene). Alternatively, the housing 37 may be made of fluorinated synthetic resins such as polyimide, polyamide, or polyacetal, or synthetic resins such as polytetrafluoro-ethylene (Teflon (registered commercial name)) or nylon. Further alternatively, synthetic resins such as PC (polycarbonate) or ABS (acrylonitrile-butadiene-stylene) may be used. Also, alternatively, the housing 37 may be formed of liquid crystal polymer which enables molding with extremely high precision. Particularly, in the case of using liquid crystal polymer for the housing 37, the lubrication oil is maintained so that the anti-friction characteristic is excellent.

The rotation shaft 31 supported rotatably by the thrust bearing 34 formed integrally with the radial bearing 33 provided in the housing 37 and the housing 37 is formed such that the bearing support part 31a supported by the thrust bearing 34 of the shaft body 31b has an arc-like shape or a tapered top end. An attachment part 32 to which, for example, the rotor 18 of the motor 10 is attached is provided on the other side of the rotation shaft 31.

The rotation shaft 31 is supported on the housing 37 in a manner as follows. As shown in FIG. 9, the bearing support part 31a on one end side of the rotation shaft 31 is supported by the thrust bearing 34. The outer circumferential surface of the shaft body 31b is supported by the radial bearing 33. The attachment part 32 in the other end side is projected from the shaft insertion hole 45 provided in the upper shielding part 44 of the housing body 42.

As shown in FIG. 9, the rotation shaft 31 is provided with a groove part 31c for preventing the shaft from being pulled out, on one end side 33a of the radial bearing 33 where the thrust bearing 34 of the radial bearing 33 is provided, i.e., between the bearing support part 31a and the shaft body 31b. At a position corresponding to the shaft stopper groove part 31c, the spacing member 35 is provided with a shaft stopper member 46 as a stopper mechanism which prevents the rotation shaft 31 from being pulled out of the radial bearing 33 and housing 37. The shaft stopper member 46 is made of material which is elastically deformable in the radial direction of the rotation shaft 31 and is hardly deformable in the axial direction.

Figure 13:
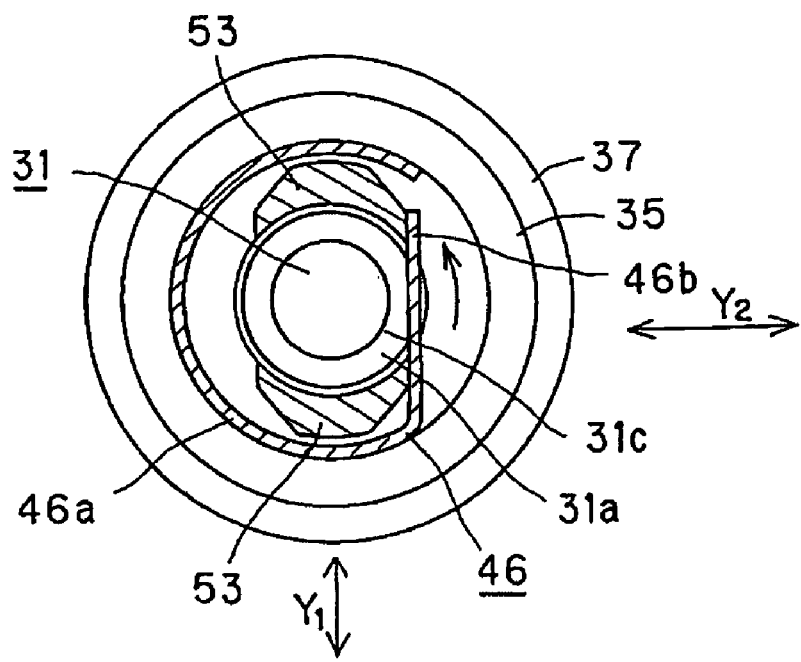
FIG. 13 is a cross-sectional view showing a state where a shaft stopper member is attached to the rotation shaft of the bearing unit to which the present invention is applied.

As shown in FIG. 13, the shaft stopper member 46 has a movement direction regulation part 46b which regulates movement of the rotation shaft 31 in the axial direction and rotation of the shaft stopper member 46 in the circumferential direction, and a support part 46a which supports the movement direction regulation part 46b and regulates the position of the shaft stopper member 46 in the housing 37. This shaft stopper member 46 is formed such that the support part 46a has a substantially arc-like shape and the movement direction regulation part 46b is elastic and formed to be linear and continuous from one end of the support part 46a. In other words, the shaft stopper member 46 is D-shaped.

This support part 46a is engaged with regulation protrusions 53 provided in the spacing member 35 integral with the housing and has a contact therewith in the direction Y1. Thus, the position of the shaft stopper member 46 is regulated in the spacing member 35, and a proper positional relationship is maintained between the shaft stopper groove part 31c and the movement direction regulation part 46b of the shaft stopper member 46.

Also, as shown in FIG. 13, the movement direction regulation part 46b contacts the regulation protrusions 53 in the direction Y2. Therefore, the movement direction regulation part 46b is elastically displaced toward the shaft by the flow of viscous fluid which is generated by rotation of the rotation shaft 31. The movement direction regulation part 46b and the rotation shaft 31 are thus prevented from contacting each other, so that deterioration of the rotation performance of the bearing unit is prevented.

Of the shaft stopper member 46, the support part 46a and the movement direction regulation part 46b are formed, for example, by bending a steel material, such as elastic round steel, having a circular cross-section into a continuous ring-like shape. Since the cross-sectional shape of the bearing stopper member 46 is thus round, this member is capable of smoothly and steadily sliding on the bearing support part 31a. The cross-sectional shape of the bearing stopper member 46 needs only to have a structure in which smooth and steady slidable contact can be made when slidably contacting the bearing support part 31a. Alternatively, the cross-sectional shape may be elliptical. Even if the cross-sectional shape is rectangular, no problem will occur as long as the corners are appropriately filleted so that smooth slidable contact can be made. In this case, the shaft stopper member 46 has a circular cross-sectional shape. Therefore, this member has smooth and steady slidable contact with the bearing support part 31a, and processing is facilitated.

Figure 14:
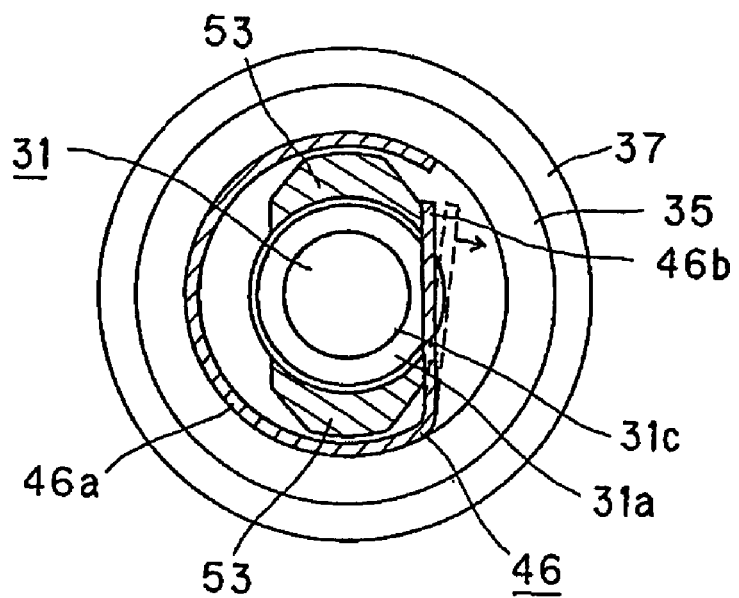
FIG. 14 is a view showing a state where a movement direction regulation part of the shaft stopper member is elastically deformed in the radial direction of the shaft when the rotation shaft of the bearing unit to which the present invention is applied is inserted.

In the shaft stopper member 46, when the rotation shaft 31 is inserted in the housing 37, as shown in FIG. 14, the movement direction regulation part 46b is put into slidable contact with the bearing support part 31a of the rotation shaft 31 and is elastically deformed toward the outside in the radial direction of the shaft. After the rotation shaft 31 is inserted in the housing 37, the movement direction regulation part 46b returns to the original position, to prevent the rotation shaft 31 from moving in the axial direction and being pulled out of the housing 37. Since the cross-sectional shape of the shaft stopper member 46 is circular as described above, the shaft stopper member 46 smoothly and steadily contacts and slides on the substantially arc-like part of the bearing support part 31a. The bearing stopper member 46 is hence steadily deformed elastically to the outside in the radial direction of the shaft.

The shaft stopper member 46 does not have a structure in which the member is warped in the axial direction to be inserted with the rotation shaft 31, like the prior art. Therefore, the height of the step part 51 of the spacing member 35 as described above and the height of the space 52 of one end side 33a of the radial bearing 33 are as small in the axial direction as the distance which allows the movement direction regulation part 46b only to be opened/closed when contacting slidably the bearing support part 31a. Thus, these heights can be set to nearly the same dimension as the thickness of the shaft stopper member 46 in the axial direction. Meanwhile, in the bearing unit 30, a force sometimes acts on the rotation shaft 31 in a direction in which the rotation shaft 31 is pulled out from the housing 37, if the rotation shaft 31 is lifted up during assembly or the rotation shaft 31 is lifted up on some impact.

In the case of using a conventional shaft stopper member which can be warped in the axial direction, the liquid surface of the lubrication oil 38 lowers as the rotation shaft 31 is lifted up from the lubrication oil 38 in the housing 37. That is, the lubrication oil 38 flows into the portion where the rotation shaft 31 had been dipped in the lubrication oil 38 before the rotation shaft 31 was moved. The liquid surface of the lubrication oil 38 lowers accordingly. In a conventional bearing unit, the liquid surface of the lubrication oil shifts down to the bearing surfaces of the radial bearing and the rotation shaft or below the bearing surfaces, when the rotation shaft 31 is lifted up from the housing. Otherwise, when the liquid surface of the lubrication oil lowers, a problem occurs in that air is mixed between the bearing surfaces of the radial bearing and the rotation shaft. Alternatively, there is a problem that the performance of the dynamic fluid bearing cannot be brought out. There may be further problems, e.g., the air mixed between the bearing surfaces of the radial bearing and the rotation shaft may swell during operation and may press out the lubrication oil.

Figure 15:
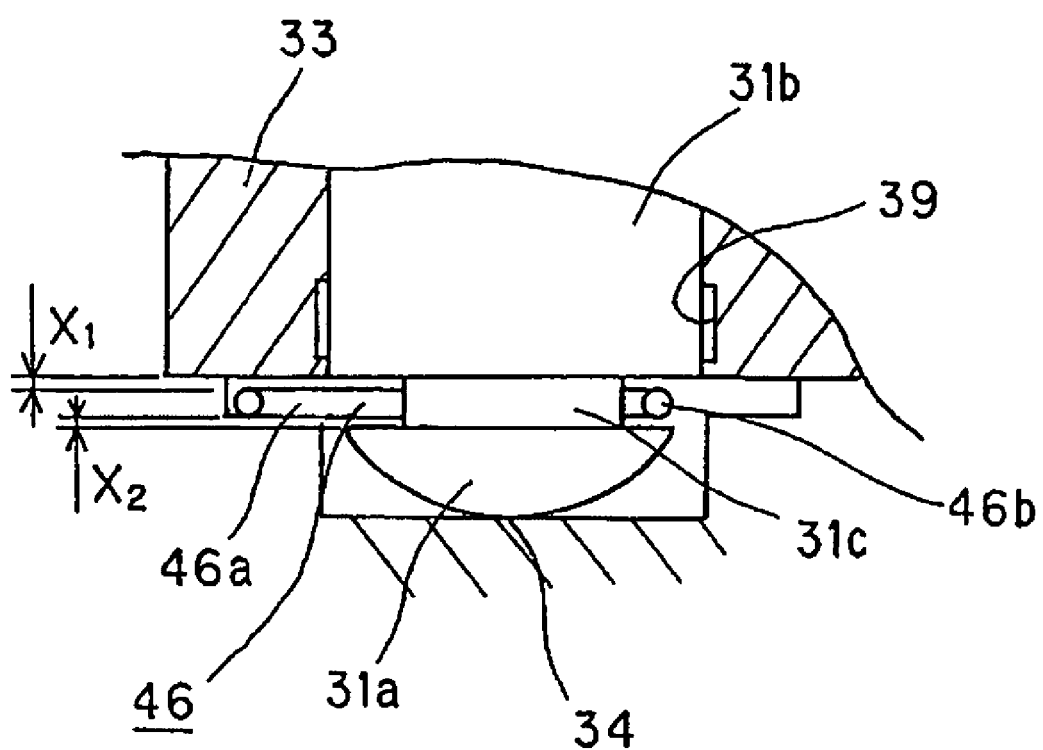
FIG. 15 is a view showing a gap between the shaft stopper member and the radial bearing of the bearing unit to which the present invention is applied, and a gap between the shaft stopper member and a shaft stopper groove part.

In contrast, in the shaft stopper member 46, as shown in FIG. 15, the gaps in the space 52 in the height direction, i.e., the gap x1 between the shaft stopper member 46 and the radial bearing 33 and the gap x2 between the shaft stopper member 46 and the shaft stopper groove part 31c, can be minimized. Therefore, when a certain force acts in the direction of pulling out the rotation shaft 31 from the housing 37, the rotation shaft 31 is engaged with the shaft stopper member 46 and is prevented from being pulled out. As a result, the lubrication oil is prevented from disappearing between the bearing surfaces of the radial bearing 33 and the rotation shaft 31, and air is prevented from being mixed in the lubrication oil around the bearing surfaces.

Figure 16:
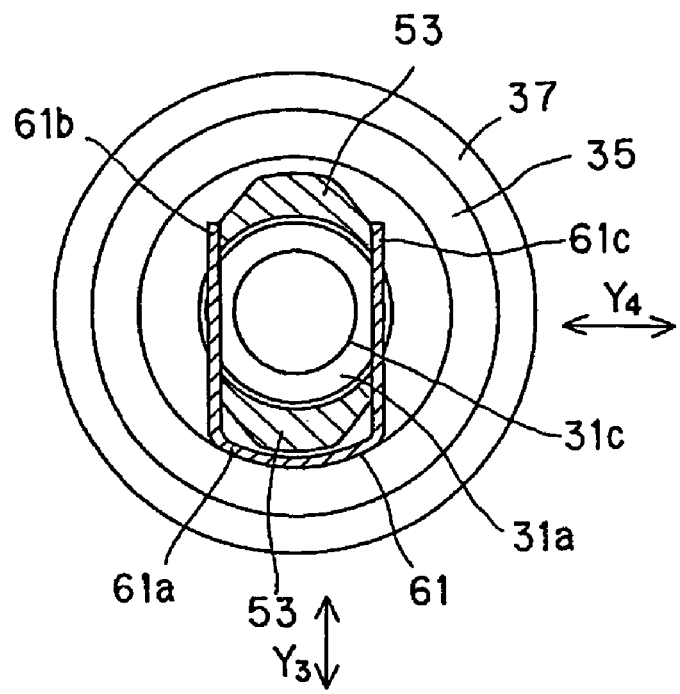
FIG. 16 is a cross-sectional view showing a state where a shaft stopper member according to another example is attached to the rotation shaft of the bearing unit to which the present invention is applied.

Although this bearing unit 30 uses a D-shaped shaft stopper member which is composed of a support part 46a and one movement direction regulation part 46b as shown in FIG. 9, the shape of the shaft stopper member 46 may have an U-shape which is composed of a support part and two movement direction regulation parts as shown in FIG. 16.

The shaft stopper member 61 as shown in FIG. 16 has movement direction regulation parts 61b and 61c, which regulate the movement of the rotation shaft 31 in the axial direction and also regulate the shaft stopper member 61 from rotating in the circumferential direction of the shaft, and a support part 61a which links the movement direction regulation parts 61b and 61c to each other and supports these parts, thereby regulating the position of the shaft stopper member 61 in the housing 37. In the shaft stopper member 61, the support part 61a is formed substantially like an arc, and the movement direction regulation parts 61b and 61c is elastic and formed, as a pair, to be continuous from both ends of the support part 61a. The pair of movement direction regulation parts 61b and 61c are formed linearly at positions facing each other with the shaft stopper groove part 31c of the rotation shaft 31 interposed therebetween, in a so-called U-shape.

Like the support part 46a, the support part 61a is engaged with and contacts the regulation protrusions 53 provided on the spacing member 35 formed integrally with the housing in the direction Y3. Thus, the support part 61a regulates the position of the shaft stopper member 61 in the spacing member 35 and maintains a proper positional relationship between the shaft stopper groove part 31c and the movement direction regulation parts 61b and 61c of the shaft stopper member 61. The movement direction regulation parts 61b and 61c contact the regulation protrusions 53 in the direction Y4. As a result, the movement direction regulation parts 61b and 61c are prevented from being elastically displaced toward the shaft and from contacting the rotation shaft 31 under the influences of the flow of a viscous fluid generated by rotation of the rotation shaft 31. Thus, the rotation performance of the bearing unit is prevented from deteriorating. In the case of this shaft stopper member 61, for example, an elastic steel material such as round steel having a circular cross-section is bent to form the support part 61a and the movement direction regulation parts 61b and 61c.

Figure 17:
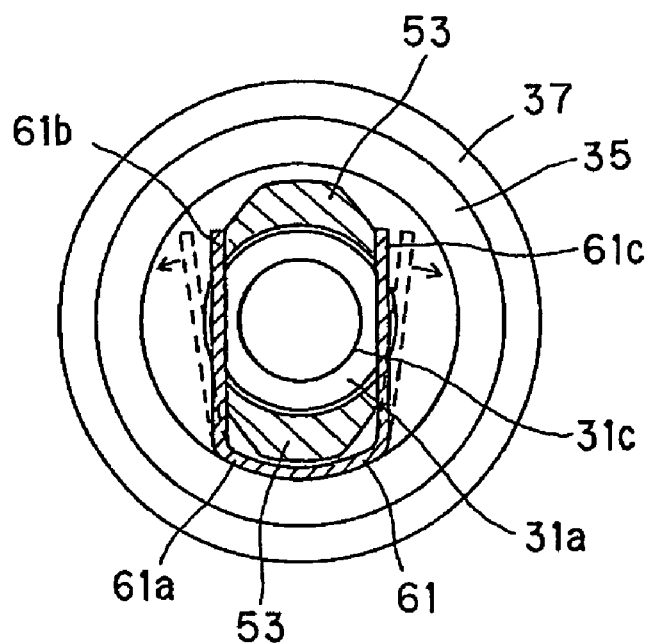
FIG. 17 is a view showing a state where movement direction regulation parts of the shaft stopper member according to another example are elastically deformed in the radial direction of the shaft when the rotation shaft of the bearing unit to which the present invention is applied is inserted.

When the rotation shaft 31 is inserted in the housing 37, the movement direction regulation parts 61b and 61c of the shaft stopper member 61 are elastically deformed only in the radial direction of the shaft, as shown in FIG. 17. After the rotation shaft 31 is inserted in the housing 37, the movement direction regulation parts 61b and 61c return to the original positions, so that the rotation shaft 31 moves in the axial direction and is prevented from being pulled out from the housing 37. In this shaft stopper member 61, like the foregoing shaft stopper member 46, the gaps in the space 52 in the height direction, i.e., the gap between the shaft stopper member 61 and the radial bearing 33 and the gap between the shaft stopper member 61 and the shaft stopper groove part 31c can be minimized. Therefore, when a certain force acts in the direction of pulling out the rotation shaft 31 from the housing 37, the rotation shaft 31 is engaged with the shaft stopper member 61 and is thereby prevented from being pulled out. As a result, the lubrication oil is prevented from being removed from between the bearing surfaces of the radial bearing 33 and the rotation shaft 31, and air is prevented from being mixed in the lubrication oil around the bearing surfaces.

Further, since the U-shaped shaft stopper member 61 is provided with movement direction regulation parts 61b and 61c at two positions, deformation and fracture can be reduced when load is applied to the rotation shaft 31 in the axial direction due to some impact, compared with the foregoing D-shaped shaft stopper member in which a movement direction regulation part is provided at one position.

The shaft stopper member, however, is not limited to the U-shape or D-shape as described above. For example, the shaft stopper member may have a rectangular U-shape, as a modified form of the U-shape, in which the arc-like support part 61a of the U-shaped shaft stopper member 61 is formed to be linear. In this shaft stopper member as a modified form of the rectangular U-shaped shaft stopper member, advantages similar to those of the U-shaped shaft stopper member 61 can be obtained. Further, a step of processing for forming an arc-like shape can be omitted from a process of forming the support part and the movement direction regulation part. When using the shaft stopper member, the shape of the regulation protrusions 53 may be modified to correspond to the shape of the support part. Then, the position of the shaft stopper member in the spacing member is regulated, and a proper positional relationship is maintained between the shaft stopper groove part, the movement direction regulation part of the shaft topper member, and the rotation regulation part.

Further, the shaft stopper member may be V-shaped so that the member is bent at only one position. The V-shaped shaft stopper member is composed of a V-shaped support part, and a pair of linear movement direction regulation parts formed to be continuous to both ends of the support part. The V-shaped shaft stopper member achieves advantages similar to those of the U-shaped shaft stopper member 61 described above. Further, processing steps for forming the support part and the movement direction regulation parts can be shortened. When using this shaft stopper member, the shape of the regulation protrusions 53 may be modified to correspond to the shape of the support part. Then, the shaft stopper member in the spacing member is prevented from rotating in the circumferential direction of the shaft.

Thus, in the bearing unit to which the present invention is applied, the shape of the shaft stopper member is not limited by any other conditions than the following. That is, the shaft stopper member includes a movement direction regulation part which regulates movement of the rotation shaft in the axial direction and rotation of the shaft stopper member in the circumferential direction of the shaft, and a support part which supports the movement direction regulation part and regulates the position of the shaft stopper member in the housing.

Meanwhile, the shaft insertion hole 45 of the housing 37 is formed to have an inner diameter slightly greater than the outer diameter of the shaft body 31b so that the rotation shaft 31 inserted in the shaft insertion hole 45 rotates without contacting the inner circumferential surface of the shaft insertion hole 45. At this time, the shaft insertion hole 45 is formed with a gap 47 having a distance c maintained between the inner circumferential surface and the outer circumferential surface of the shaft body 31b, such that the gap is enough to prevent the lubrication oil 38 filled in the housing 37 from leaking from the inside of the housing 37. Thus, the upper shielding part 44 in which the shaft insertion hole 45 is formed with the gap 47 to the rotation shaft 31 which is formed to prevent leakage of the lubrication oil 38 filled in the housing 37 has an oil sealing part.

Since the upper shielding part 44 formed integrally with the housing 37 is made of synthetic resins, such as polyimide, polyamide, or nylon, an angle of 60° or so can be ensured as a contact angle of the inner circumferential surface of the shaft insertion hole 45 to the lubrication oil 38. In the bearing unit 30 to which the present invention is applied, the contact angle of the lubrication oil 38 to the upper shielding part 44 can be increased without applying a surfactant to the upper shielding part 44 including the inner circumferential surface of the shaft insertion hole 45 forming part of the oil sealing part. It is therefore possible to prevent the lubrication oil 38 from flowing to the outside of the housing 37 through the shaft insertion hole 45 due to centrifugal force generated by rotation of the rotation shaft 31.

Further, a tapered part 48 is provided on which the outer circumferential surface faces the inner circumferential surface of the shaft insertion hole 45 of the rotation shaft 31. The tapered part 48 is inclined so as to enlarge outwards the gap 47 formed between the outer circumferential surface of the rotation shaft 31 and the inner circumferential surface of the shaft insertion hole 45. This tapered part 48 creates a pressure gradient with respect to the gap 47 formed by the outer circumferential surface of the rotation shaft 31 and the inner circumferential surface of the shaft insertion hole 45, and generates force to suction the lubrication oil 38 filled in the housing 37 into the housing 37. When the rotation shaft 31 rotates, the lubrication oil 38 is suctioned into the housing 37, so that the lubrication oil 38 steadily enters into the dynamic pressure generation grooves 39 of the radial bearing 33 constructed in the dynamic pressure fluid bearing. As a result, the rotation shaft 31 is stably supported, and the lubrication oil 38 filled in the housing 37 can be prevented from leaking.

Figure 18:
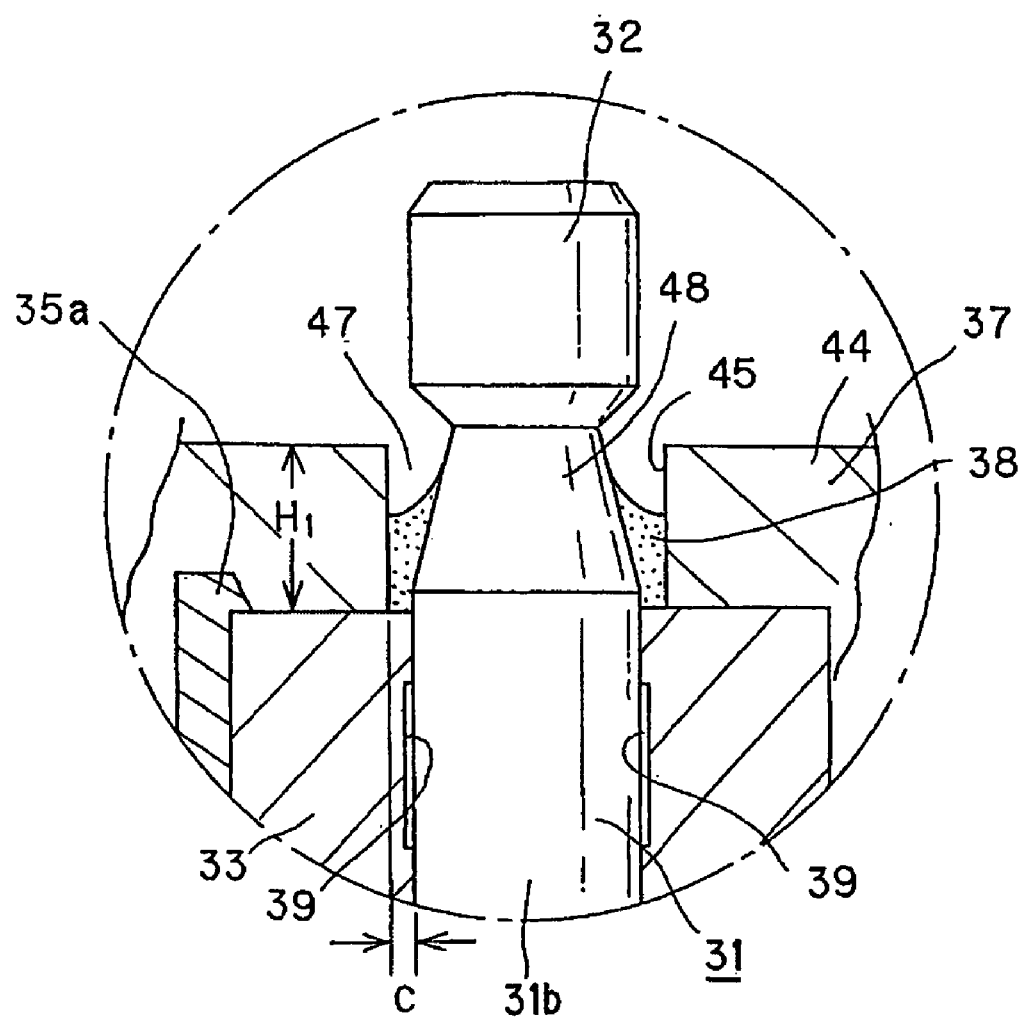
FIG. 18 is a cross-sectional view showing a gap formed by the outer circumferential surface of the rotation shaft and the shaft insertion hole provided in the housing.

In the bearing unit 30 to which the present invention is applied, the lubrication oil 38 which enters into the dynamic pressure generation grooves 39 provided in the radial bearing 33 forming part of the dynamic pressure fluid bearing to generate dynamic pressure is filled so as to face the gap 47 formed by the tapered part 48 formed on the rotation shaft 31 from inside the housing 37 and by the inner circumferential surface of the shaft insertion hole 45, as shown in FIGS. 9 and 18. Specifically, the lubrication oil 38 is filled in a gap in the housing 37, and further, the radial bearing 33 made of sintered metal is immersed therein.

The gap 47 formed between the tapered part 48 formed on the rotation shaft 31 and the inner circumferential surface of the shaft insertion hole 45 will now be described. The minimum size of the gap 47 corresponds to the distance c defined between the outer circumferential surface of the rotation shaft 31 and the inner circumferential surface of the shaft insertion hole 45. This distance c should preferably be 20 μm to 200 μm and most preferably be about 100 μm. If the distance c is smaller than 20 μm, it is difficult to ensure the molding precision when the housing 37 of the bearing unit 30 is formed from synthetic resins by integral molding. Otherwise, if the distance c of the gap 47 is greater than 200 μm, the impact resistance obtained by scattering lubrication oil 38 filled in the housing 37 deteriorates when the bearing unit 30 receives impact.

The shock resistance obtained by scattering the lubrication oil 38 filled in the housing 37 is inversely proportional to the square of the distance c of the gap 47. The rise of the oil surface due to thermal expansion is inversely proportional to the size of the distance c. Therefore, shock resistance improves as the distance c is reduced. However, the rise of the oil surface height of the lubrication oil 38 due to a temperature increase becomes so great and abrupt that the shaft insertion hole 45 has to be thicker in the axial direction.

For example, in a bearing unit 30 having a rotation shaft 31 whose diameter is 2 to 3 mm, the distance c of the gap 47 formed between the rotation shaft 31 and the shaft insertion hole 45 is about 100 μm. The height H1 of the shaft insertion hole 45, i.e., the thickness of the upper shielding part 44 of the housing 37, is about 1 mm. Then, the shock resistance is 1000 G or higher, and the heat resistance characteristic shows resistance up to 80° C. Accordingly, it is possible to construct a highly reliable bearing unit 30 which prevents scattering of the lubrication oil 38 filled in the housing 37.

Further, the bearing unit 30 to which the present invention is applied is provided with the tapered part 48 which inclines the distance c of the gap 47 formed between the outer circumferential surface of the rotation shaft 31 and the inner circumferential surface of the shaft insertion hole 45, such that the distance c is enlarged toward the outside of the housing 37. Therefore, a pressure gradient is created with respect to the distance c of the gap 47 defined by the outer circumferential surface of the rotation shaft 31 and the inner circumferential surface of the shaft insertion hole 45. Accordingly, the force of suctioning the lubrication oil 38 filled in the housing 37 into the housing 37 is generated by centrifugal force generated as the rotation shaft 31 rotates.

That is, in the bearing unit 30 to which the present invention is applied, the gap 47 formed between the outer circumferential surface of the rotation shaft 31 and the inner circumferential surface of the shaft insertion hole 45 prevents scattering of the lubrication oil 38 by means of surface-tension sealing.

The surface-tension sealing will now be described. The surface-tension sealing is a sealing method using a capillary phenomenon of fluid. It is generally known that the suction pressure increases as the capillary narrows, according to an expression concerning the height of rise of liquid based on the capillary phenomenon and a relational expression concerning the pressure and fluid height. In the bearing unit 30 to which the present invention is applied, the lubrication oil 38 which enters into the gap 47 formed between the outer circumferential surface of the rotation shaft 31 and the inner circumferential surface of the shaft insertion hole 45 has a ring-like shape. In this case, the suction pressure similarly increases as the distance c of the gap 47 formed between the outer circumferential surface of the rotation shaft 31 and the inner circumferential surface of the shaft insertion hole 45 decreases. Specific calculations will be as follows. Where the distance c of the gap 47 formed between the outer circumferential surface of the rotation shaft 31 and the inner circumferential surface of the shaft insertion hole 45 is 0.02 cm (0.2 mm), the surface tension γ of viscous fluid is 30 dyn/cm$^2$, and the contact angle θ of the lubrication oil 38 is 15°, the suction pressure is $2.86 \times 10^{-3}$ atm (atmosphere). The suction pressure increases as the distance c of the gap 47 decreases. Therefore, the tapered part 48 provided on the rotation shaft 31 enables suctioning of the lubrication oil 38 as viscous fluid in the direction in which the distance c of the gap 47 decreases, i.e., a direction toward the inside of the housing 37.

Thus, the tapered part 48 is provided such that the distance c of the gap 47 is formed between the inner circumferential surface of the shaft insertion hole 45 and the outer circumferential surface of the rotation shaft 31, which form part of the sealing part which prevents the lubrication oil 38 filled in the housing 37 from leaking to the outside of the housing 37. As a result, a pressure gradient is created with respect to the lubrication oil 38 situating in the gap 47 formed by the outer circumferential surface of the rotation shaft 31 and the inner circumferential surface of the shaft insertion hole 45. That is, the pressure gradient applied to the lubrication oil 38 increases toward the inside of the housing 37 where the distance c of the gap 47 is smaller. Since this pressure gradient is applied to the lubrication oil 38, pressure which suctions the lubrication oil 38 toward the inside of the housing 37 continuously acts on the lubrication oil 38. Therefore, even when the rotation shaft 31 rotates, air is not mixed into the lubrication oil 38 existing in the gap 47.

If the tapered part 48 as described above is not provided, i.e., if the distance c of the gap 47 formed between the outer circumferential surface of the rotation shaft 31 and the inner circumferential surface of the shaft insertion hole 45 is constant in the height direction of the shaft insertion hole 45, no pressure gradient is applied to the lubrication oil 38 which enters into the gap 47 between the outer circumferential surface of the rotation shaft 31 and the inner circumferential surface of the shaft insertion hole 45. Therefore, the lubrication oil 38 exists uniformly in the gap 47. That is, the lubrication oil 38 which enters into the gap 47 functioning as a sealing part by narrowing the distance c between the outer circumferential surface of the rotation shaft 31 and the inner circumferential surface of the shaft insertion hole 45 may move in the gap 47 and mix with air as the rotation shaft 31 rotates. Thus, if air is mixed in the lubrication oil 38, the air swells due to temperature changes, air-pressure changes, and the like, and scatters out the lubrication oil 38 to the outside of the housing 37 from the gap 47 forming part of the sealing part.

In contrast, the tapered part 48 by which the distance c of the gap 47 formed between the outer circumferential surface of the rotation shaft 31 and the inner circumferential surface of the shaft insertion hole 45 is decreased toward the inside of the housing 37 is provided, like in the bearing unit 30 to which the present invention is applied. In this manner, a pressure gradient is applied to the lubrication oil 38 which has entered into the gap 47 such that the pressure increases toward the inside of the housing 37. Therefore, it is possible to prevent air from being mixed in the lubrication oil 38 when the rotation shaft 31 rotates.

Further, providing the tapered part 48 as described above not only prevents the lubrication oil 38 which has entered into the gap 47 formed between the outer circumferential surface of the rotation shaft 31 and the inner circumferential surface of the shaft insertion hole 45 from scattering to the outside of the housing 37, but it also makes the lubrication oil 38 fill throughout the whole circumference of the rotation shaft 31, even when the rotation shaft 31 is deviated to the shaft insertion hole 45 provided in the housing 37. Therefore, a shortage of the lubrication oil 38 around the rotation shaft 31 can be prevented, so that stable rotation of the rotation shaft 31 can be guaranteed.

If the tapered part 48 is not provided when the rotation shaft 31 is deviated to the shaft insertion hole 45 provided in the housing 37, the lubrication oil 38 concentrates on an area where the distance c between the outer circumferential surface of the rotation shaft 31 and the inner circumferential surface of the shaft insertion hole 45 is smaller. In the opposite area where the distance c is larger, the lubrication oil 38 runs out and air is mixed up. If air is mixed up in the lubrication oil 38, the air swells due to temperature changes, air-pressure changes and the like, so that the lubrication oil 38 scatters out of the housing 37 from the gap 47 forming part of the sealing part.

In contrast, if the rotation shaft 31 is provided with the tapered part 48 like the bearing unit 30 to which the present invention is applied, the gap 47 having a uniform distance c continuously exists on the elliptic path along which the deviated rotation shaft 31 rotates, even when the rotation shaft 31 is deviated relatively to the shaft insertion hole 45 provided in the housing 37. The distance c of the gap 47 formed between the outer circumferential surface of the rotation shaft 31 and the inner circumferential surface of the shaft insertion hole 45 is constant throughout the whole circumference of the rotation shaft 31. Therefore, the phenomenon of the lubrication oil 38 concentrating on an area where the distance c is small does not occur. As a result, the lubrication oil 38 is prevented from flowing out of the gap 47 and the housing 37 as well. In the bearing unit 30 as described above, the tapered part 48 is provided on the side of the rotation shaft 31. However, the tapered part 48 may be provided alternatively on the inner circumferential surface of the shaft insertion hole 45 on the side of the housing 37.

A description will now be given of a process of manufacturing the bearing unit 30 constructed as described above to which the present invention is applied.

Figure 19:
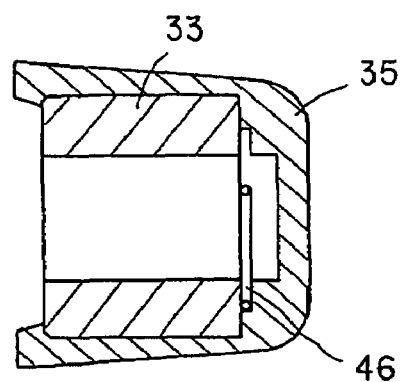
FIG. 19 is a view depicting a step of temporary assembly in a process of manufacturing a bearing unit to which the present invention is applied.

To manufacture the bearing unit 30 to which the present invention is applied, temporary assembly is carried out by attaching a spacing member 35 to an end side of the outside of the radial bearing 33. When temporarily assembling the radial bearing 33 and the spacing member 35, a shaft stopper member 46 as a shaft stopper means of the rotation shaft 31 is installed on the step part 51 of the spacing member 35, as shown in FIG. 19. Next, the spacing member 35 is installed on the radial bearing 33 as a dynamic pressure fluid bearing. At this time, the nail-like regulation parts 35a of the spacing member 35 are engaged with an end part 33b of the radial bearing 33. Therefore, the radial bearing 33 and the spacing member 35 are steadily maintained integrally. Further, the support part 46a of the shaft stopper member 46 is positioned to be engaged with the regulation protrusions 53 of the spacing member 35.

Figure 20:
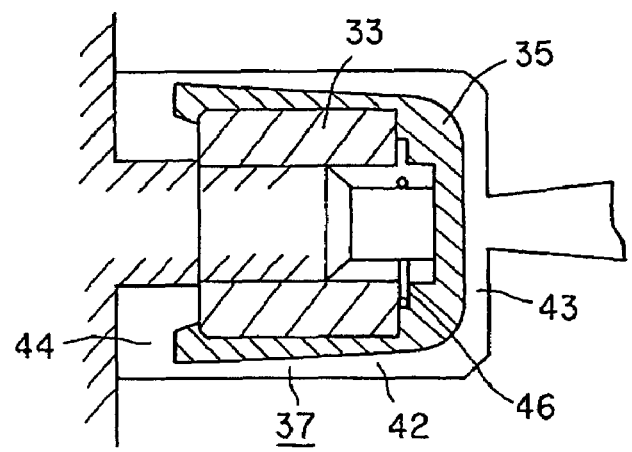
FIG. 20 is a view depicting a step of molding the housing by outsert molding in a process of manufacturing a bearing unit to which the present invention is applied.

Next, the radial bearing 33 and the spacing member 35 thus temporarily assembled are attached to a metal mold. As shown in FIG. 20, a housing 37 is then formed of any of the synthetic resins described above by outsert molding around and outside the temporarily assembled radial bearing 33 and spacing member 35. At this time, i.e., when the housing 37 is molded by outsert molding, the radial bearing 33 and the spacing member 35 are exposed to the outside through cut-off parts 35b of the spacing member 35. Therefore, the radial bearing 33 and spacing member 35 are integrated with the inside of the housing 37 and clamped between the upper shielding part 44 and the bottom shielding part 43 which are integrally formed at upper and lower portions of a cylindrical housing body 42.

At this time, synthetic resins do not flow into the space between the spacing member 35 and the radial bearing 33 because this space is shut off by the spacing member 35 when the housing 37 is molded by outsert molding.

Figure 21:
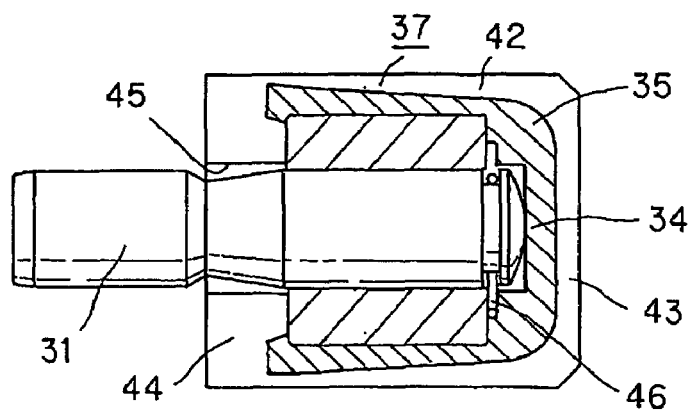
FIG. 21 is a view depicting a step of inserting the rotation shaft in the housing in a process of manufacturing a bearing unit to which the present invention is applied.

Next, as shown in FIG. 21, the rotation shaft 31 is inserted into the housing 37 through the shaft insertion hole 45 provided in the upper shielding part 44. At this time, the rotation shaft 31 is inserted in the housing 37, with the bearing support part 31a put in contact with the thrust bearing 34 and inserted in the radial bearing 33. The rotation shaft 31 supported by the thrust bearing 34 and the radial bearing 33 is rotatably supported in the housing 37. When the rotation shaft 31 is inserted in the housing 37, the movement direction regulation parts 46b of the shaft stopper member 46 provided in the spacing member 35 are elastically deformed in the radial direction of the rotation shaft 31, as shown in FIG. 14, thereby allowing the shaft support part 31a to be inserted. At this time, the movement direction regulation part 46b of the shaft stopper member 46 has a circular cross-sectional shape, so that the shaft stopper member 46 steadily and smoothly contacts the bearing support part 31a and is smoothly elastically deformed to the outside in the radial direction of the shaft.

The rotation shaft 31 is installed in the housing, at the position where the bearing support part 31a penetrates through the shaft stopper member 46 and where the shaft stopper groove part 31c is positioned inside the shaft stopper member 46. Further, the shaft stopper member 46 recovers its own normal shape by recovery force against elastic deformation of the movement direction regulation part 46b of the shaft stopper member 46 in the radial direction of the shaft. That is, the movement direction regulation part 46b returns to its own original position and so can prevent the shaft from being pulled out. The shaft stopper member 46 functions as a shaft stopper which prevents the rotation shaft 31 from being pulled out of the housing.

After the rotation shaft 31 is inserted in the housing 37, the lubrication oil 38 is filled into the housing 37. Filling of the lubrication oil 38 is carried out by immersing the housing 37 in which the rotation shaft 31 is inserted, in a filler vessel not shown but containing the lubrication oil 38. Next, the filler vessel in which the housing is immersed is subjected to vacuum suction. Thereafter, the filler vessel subjected to vacuum suction is picked up into an air atmosphere. Thus, the lubrication oil 38 is filled in the housing 37.

At this time, the lubrication oil 38 is filled in the following manner. That is, the lubrication oil 38 is prevented from leaking to the outside through the shaft insertion hole 45 even when the lubrication oil 38 swells due to a temperature change. Also, the lubrication oil 38 filled in the gap 47 formed between the rotation shaft 31 and the shaft insertion hole 45 does not run short even when the lubrication oil 38 contracts due to a temperature change. More specifically, changes in height of the oil surface of the lubrication oil 38 due to temperature changes are set so as to fall within the range of the shaft insertion hole 45.

Since filling of the lubrication oil 38 into the housing 37 is carried out by vacuum suction using a vacuum device, the pressure inside the housing 37 is lower than the outside of the housing 37. As a result, the lubrication oil 38 is easily prevented from leaking out of the housing 37.

In the bearing unit 30 to which the present invention is applied, the radial bearing 33 is formed of sintered metal. Therefore, the lubrication oil 38 is filled in the radial bearing 33. Further, the lubrication oil 38 is filled in the dynamic pressure generation grooves 39, which generates a dynamic pressure due to rotation of the rotation shaft 31. That is, the lubrication oil 38 is filled in all gaps in the housing 37.

In the bearing unit described above, the housing is formed of a molded body made of synthetic resins. However, the material is not limited to synthetic resins, the bearing unit may be formed of synthetic resins mixed with metal material moldable with use of a metal mold or may be formed of other molding material. When the housing is formed of a material other than synthetic resins, there may be a case that the contact angle of the lubrication oil filled in the housing to the inner circumferential surface of the shaft insertion hole cannot be maintained to be sufficiently large. If there is a possibility that a sufficiently large contact angle of the lubrication oil cannot be maintained, the contact angle may be increased by applying a surfactant to the inner circumferential surface of the shaft insertion hole and further to the outer circumferential surface of the upper shielding part including the inner circumferential surface of the shaft insertion hole.

The bearing unit described above is formed with the thrust bearing as a part of the housing. However, the bottom shielding part or the upper shielding part provided with the thrust bearing may be formed independently from the housing body. The bottom shielding part or the upper shielding part may be integrated with the housing body by means of heat welding or ultrasound welding.

In the bearing unit 30 constructed as described above, the movement direction regulation part of the stopper member is elastically deformed only in the radial direction of the shaft when the shaft is inserted. Therefore, it is unnecessary to provide a particular space for providing the stopper member, unlike the prior art. In other words, extra gaps for warping the stopper member need not be provided between the radial bearing or the bearing stopper member and between the spacing member and the shaft stopper member. Accordingly, the bearing unit 30 can minimize the space where the stopper member is provided, so that lifting of the rotation shaft from the housing can be regulated. The liquid surface of the lubrication oil in the housing can therefore be prevented from being lowered by the lifting of the rotation shaft. Shortage of the lubrication oil around the bearing surfaces of the rotation shaft and the radial bearing can also be prevented, and air is prevented from being mixed in the lubrication oil around the bearing surfaces. As a result, the bearing unit 30 solves the problems of the conventional bearing unit and can maintain excellent lubrication performance for a long period.

The bearing unit described above uses a lubrication oil as a viscous fluid filled in the housing. However, it is possible to appropriately chose any of various kinds of viscous fluid as long as the viscous fluid has a certain viscosity and a certain surface tension.

The bearing unit to which the present invention is applied is used as a bearing not only for use in a motor in a heat radiation device or a spindle motor in a disk drive but also for use in any of various motors.

Further, the bearing unit to which the present invention is applied is not limited to use in motors but can be used for wide purposes, e.g., in a mechanism having a rotation shaft, a mechanism in which a rotatable component is supported by a shaft.

What is claimed is:

1. A bearing unit comprising:
    a shaft extending along an axial direction;
    a radial bearing which supports the shaft in a circumferential direction of the shaft;
    a spacing member forming a thrust bearing which supports an end of the shaft in a thrust direction of the shaft, the spacing member having a pair of regulation protrusions projecting in the axial direction and generally spaced apart angularly equidistantly from one another relative to the shaft;
    a housing having a closed structure except for a shaft insertion hole in which the shaft is inserted, with the radial bearing and the thrust bearing being provided inside the housing;
    a stopper member provided on an end side of the radial bearing where the thrust bearing is provided, to prevent the shaft from being pulled out of the radial bearing and disposed in the spacing member, the stopper member having at least one linearly extending movement direction regulation part and an arcuate support part integrally connected to the at least one movement direction regulation part, the at least one movement direction regulation part operative to contact the pair of regulation protrusions; and
    viscous liquid filled in the housing, wherein
    the stopper member is made of an elastic member which is elastically deformed only in the radial direction of the shaft when the shaft is inserted in the housing, and is hardly deformed in the axial direction.

2. The bearing unit according to claim 1, wherein
    the shaft has a stopper groove part at a position corresponding to the stopper member, and
    the at least one movement direction regulation part is engaged with the stopper groove part, to regulate movement of the shaft in an axial direction of the shaft and rotation of the stopper member in a circumferential direction of the shaft, and the support part supports the at least one movement direction regulation part to regulate a position of the stopper member.

3. The bearing unit according to claim 2, wherein
    the pair of regulation protrusions contact the at least one movement direction regulation part in a direction perpendicular to the shaft to regulate rotation of the stopper member in the circumferential direction of the shaft and are engaged with the support part to regulate the position of the stopper member, are provided on the side of the housing.

4. The bearing unit according to claim 2, wherein
    the pair of regulation protrusions contact the at least one movement direction regulation part in a direction perpendicular to the shaft to regulate rotation of the stopper member in the circumferential direction of the shaft and are engaged with the support part to regulate the position of the stopper member, are provided on the side of the housing, and
    of the stopper member, the support part is formed like an arc, and the at least one movement direction regulation part is formed as a pair of movement direction regulation parts continuous to both end parts of the support part, with the pair of movement direction regulation parts respectively formed linearly at positions opposite to each other with the stopper groove part of the shaft interposed therebetween.

5. A motor having a bearing unit which supports rotatably a rotor relatively to a stator, the bearing unit including:
    a shaft extending along an axial direction;
    a radial bearing which supports the shaft in a circumferential direction of the shaft;
    a spacing member forming a thrust bearing which supports an end of the shaft in a thrust direction of the shaft, the spacing member having a pair of regulation protrusions protecting in the axial direction and generally spaced apart angularly equidistantly from one another relative to the shaft;

a housing having a closed structure except for a shaft insertion hole in which the shaft is inserted, with the radial bearing and the thrust bearing being provided inside the housing;

a stopper member provided on an end side of the radial bearing where the spacing member is provided, to prevent the shaft from being pulled out of the radial bearing and disposed in the spacing member, the stopper member having at least one linearly extending movement direction regulation part and an arcuate support part integrally connected to the at least one movement direction regulation part, the at least one movement direction regulation part operative to contact the pair of regulation protrusions; and viscous liquid filled in the housing, wherein the stopper member is made of an elastic member which is structurally elastically deformed only in the radial direction of the shaft when the shaft is inserted in the housing, and is structurally hardly deformed in the axial direction.

6. An electronic apparatus comprising a motor having a bearing unit which supports rotatably a rotor relatively to a stator, the bearing unit including:

a shaft extending along an axial direction;

a radial bearing which supports the shaft in a circumferential direction of the shaft;

a spacing member forming a thrust bearing which supports an end of the shaft in a thrust direction of the shaft, the spacing member having a pair of regulation protrusions projecting in the axial direction and generally spaced apart angularly equidistantly from one another relative to the shaft;

a housing having a closed structure except for a shaft insertion hole in which the shaft is inserted, with the radial bearing and the thrust bearing being provided inside the housing;

a stopper member provided on an end side of the radial bearing where the spacing member is provided, to prevent the shaft from being pulled out of the radial bearing and disposed in the spacing member, the stopper member having at least one linearly extending movement direction regulation part and an arcuate support part integrally connected to the at least one movement direction regulation part, the at least one movement direction regulation part operative to contact the pair of regulation protrusions; and viscous liquid filled in the housing, wherein the stopper member is made of an elastic member which is structurally elastically deformed only in the radial direction of the shaft when the shaft is inserted in the housing, and is hardly deformed in the axial direction.

* * * * *